United States Patent
Inoue et al.

(10) Patent No.: US 9,852,850 B2
(45) Date of Patent: Dec. 26, 2017

(54) ELECTRODE, POWER STORAGE DEVICE, ELECTRONIC DEVICE, AND VEHICLE

(71) Applicant: Semiconductor Energy Laboratory Co., LTD., Atsugi-shi, Kanagawa-ken (JP)

(72) Inventors: Nobuhiro Inoue, Kanagawa (JP); Ryota Tajima, Kanagawa (JP); Kazutaka Kuriki, Kanagawa (JP); Mitsuhiro Ichijo, Kanagawa (JP); Yoshikazu Hiura, Kanagawa (JP); Mai Sugikawa, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 234 days.

(21) Appl. No.: 14/802,326

(22) Filed: Jul. 17, 2015

(65) Prior Publication Data

US 2016/0020035 A1 Jan. 21, 2016

(30) Foreign Application Priority Data

Jul. 18, 2014 (JP) .................................. 2014-147972

(51) Int. Cl.
*H01M 4/136* (2010.01)
*H01M 4/131* (2010.01)
(Continued)

(52) U.S. Cl.
CPC .............. *H01G 11/30* (2013.01); *H01M 4/13* (2013.01); *H01M 4/366* (2013.01); *H01M 4/386* (2013.01);
(Continued)

(58) Field of Classification Search
CPC ......... H01M 10/0427; H01M 10/0431; H01M 10/0436; H01M 10/052; H01M 10/058; H01M 10/0585; H01M 10/425; H01M 2220/20; H01M 2220/30; H01M 4/0428; H01M 4/13; H01M 4/131; H01M 4/133;
(Continued)

(56) References Cited

U.S. PATENT DOCUMENTS

2006/0134518 A1\* 6/2006 Kogetsu .............. H01M 4/0426
429/218.1
2013/0149605 A1 6/2013 Kakehata et al.
(Continued)

FOREIGN PATENT DOCUMENTS

JP 2013-235811 11/2013

*Primary Examiner* — Carlos Barcena
(74) *Attorney, Agent, or Firm* — Nixon Peabody LLP; Jeffrey L. Costellia

(57) ABSTRACT

A power storage device with high capacity is provided. Alternatively, a power storage device with excellent cycle characteristics is provided. Alternatively, a power storage device with high charge and discharge efficiency is provided. Alternatively, a power storage device with a long lifetime is provided. A negative electrode active material is provided over a negative electrode current collector, and the negative electrode active material layer is formed in such a manner that first layers and second layers are alternately stacked. The first layer includes at least an element selected from Si, Mg, Ca, Ga, Al, Ge, Sn, Pb, Sb, Bi, Ag, Zn, Cd, As, Hg, and In. The second layer includes oxygen and the same element as the one included in the first layer.

18 Claims, 21 Drawing Sheets

(51) Int. Cl.
| | | |
|---|---|---|
| *H01M 4/134* | (2010.01) | |
| *H01M 10/0525* | (2010.01) | |
| *H01G 11/30* | (2013.01) | |
| *H01M 4/13* | (2010.01) | |
| *H01M 4/36* | (2006.01) | |
| *H01M 4/38* | (2006.01) | |
| *H01M 10/052* | (2010.01) | |
| *H01M 4/04* | (2006.01) | |
| *H01M 4/133* | (2010.01) | |
| *H01M 4/139* | (2010.01) | |
| *H01M 4/58* | (2010.01) | |
| *H01M 4/587* | (2010.01) | |
| *H01M 10/04* | (2006.01) | |
| *H01M 10/058* | (2010.01) | |
| *H01M 10/0585* | (2010.01) | |
| *H01M 10/42* | (2006.01) | |

(52) U.S. Cl.
CPC ........ *H01M 10/052* (2013.01); *H01M 4/0428* (2013.01); *H01M 4/131* (2013.01); *H01M 4/133* (2013.01); *H01M 4/134* (2013.01); *H01M 4/136* (2013.01); *H01M 4/139* (2013.01); *H01M 4/587* (2013.01); *H01M 4/5825* (2013.01); *H01M 10/0427* (2013.01); *H01M 10/0431* (2013.01); *H01M 10/0436* (2013.01); *H01M 10/058* (2013.01); *H01M 10/0585* (2013.01); *H01M 10/425* (2013.01); *H01M 2220/20* (2013.01); *H01M 2220/30* (2013.01); *Y02E 60/122* (2013.01); *Y02E 60/13* (2013.01); *Y02P 70/54* (2015.11); *Y02T 10/7011* (2013.01); *Y02T 10/7022* (2013.01)

(58) Field of Classification Search
CPC ...... H01M 4/134; H01M 4/136; H01M 4/139; H01M 4/366; H01M 4/386; H01M 4/5825; H01M 4/587; H01M 2004/027; H01M 2004/028; H01M 4/1397; H01M 4/387; H01M 4/42
See application file for complete search history.

(56) References Cited

U.S. PATENT DOCUMENTS

| | | |
|---|---|---|
| 2013/0164611 A1 | 6/2013 | Nanba et al. |
| 2013/0224581 A1 | 8/2013 | Saito et al. |
| 2014/0099539 A1 | 4/2014 | Yamazaki et al. |
| 2015/0162590 A1 | 6/2015 | Takahashi et al. |
| 2015/0340691 A1 | 11/2015 | Inoue et al. |

* cited by examiner positive electrode　　　　　　　negative electrode $LiFePO_4 \rightarrow FePO_4 + Li^+ + e^-$ 　　　　　$xC + Li^+ + e^- \rightarrow LiC_x$ $x \geq 6$ positive electrode　　　　　　　negative electrode $FePO_4 + Li^+ + e^- \rightarrow LiFePO_4$ 　　　　　$LiC_x \rightarrow xC + Li^+ + e^-$ $x \geq 6$

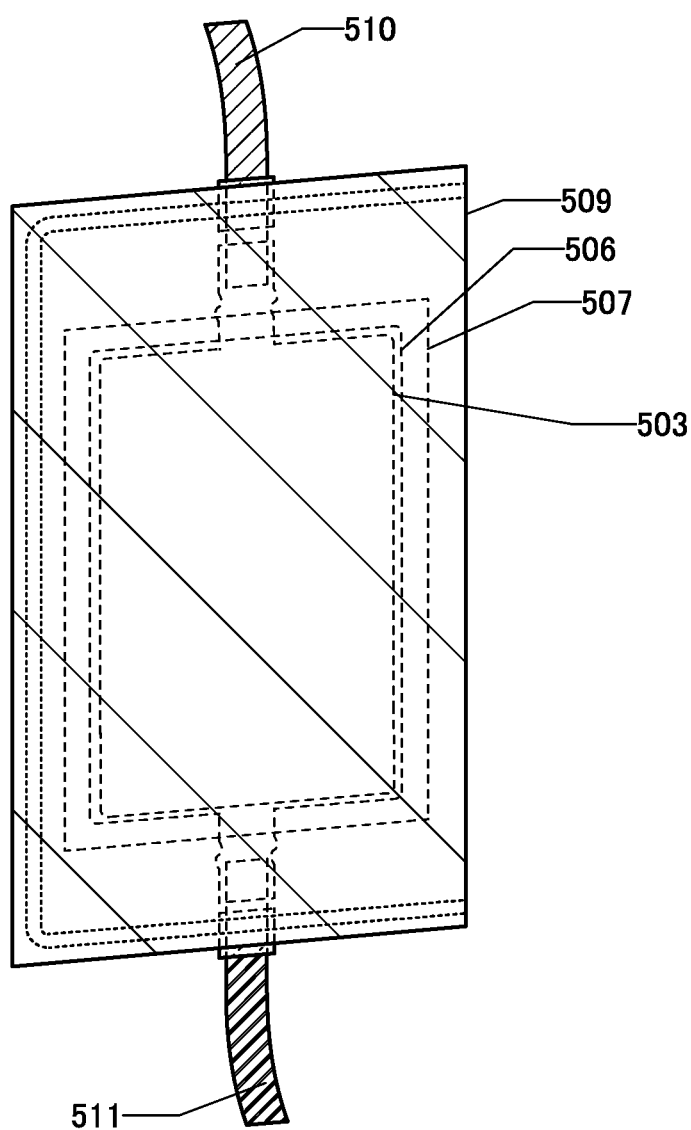

FIG. 18A1
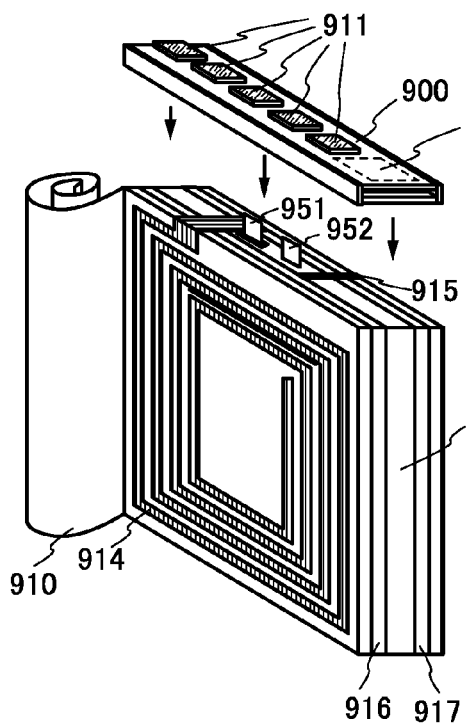
FIG. 18A2
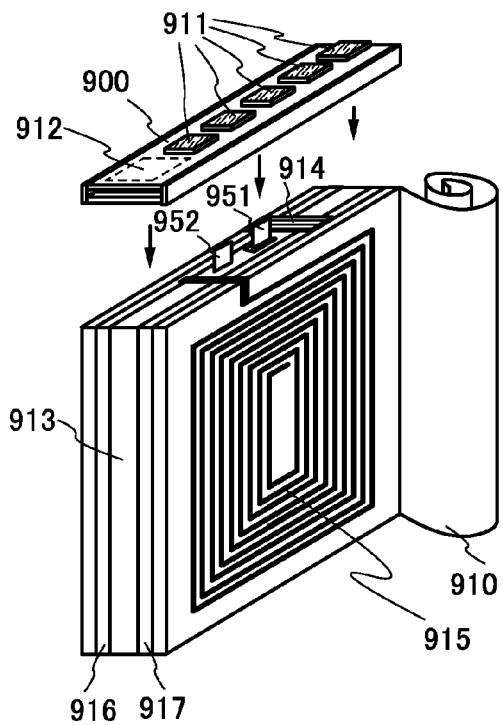
FIG. 18B1
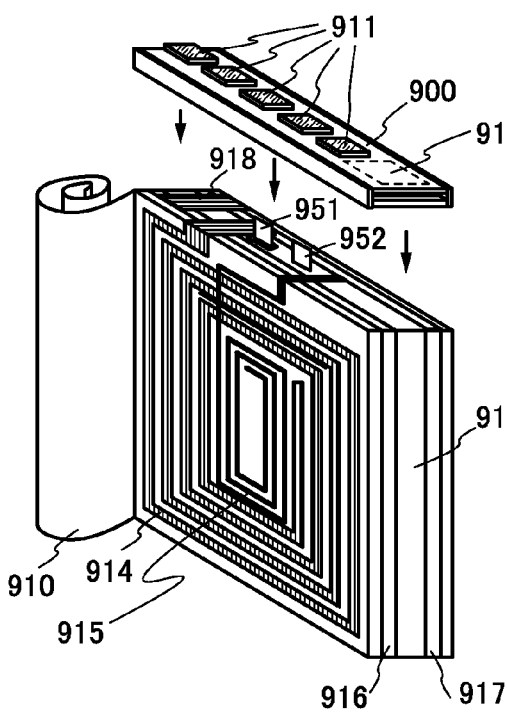
FIG. 18B2
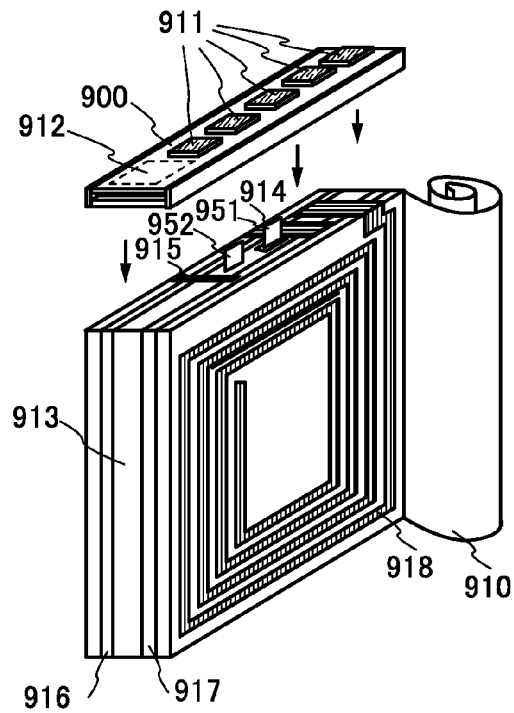

ELECTRODE, POWER STORAGE DEVICE, ELECTRONIC DEVICE, AND VEHICLE

BACKGROUND OF THE INVENTION

1. Field of the Invention

The present invention relates to an object, a method, or a manufacturing method. In addition, the present invention relates to a process, a machine, manufacture, or a composition of matter. In particular, one embodiment of the present invention relates to a semiconductor device, a display device, a light-emitting device, a power storage device, a storage device, a driving method thereof, or a manufacturing method thereof. In particular, one embodiment of the present invention relates to a power storage device and a manufacturing method thereof.

2. Description of the Related Art

In recent years, a variety of power storage devices; for example, secondary batteries such as lithium-ion secondary batteries, lithium-ion capacitors, and air cells, have been actively developed. In particular, demand for lithium-ion secondary batteries with high output and high energy density has rapidly grown with the development of the semiconductor industry, for electronic devices; for example, portable information terminals such as cellular phones, smartphones, and laptop computers, portable music players, and digital cameras; medical equipment; next-generation clean energy vehicles such as hybrid electric vehicles (HEVs), electric vehicles (EVs), and plug-in hybrid electric vehicles (PHEVs); and the like. The lithium-ion secondary batteries are essential as rechargeable energy supply sources for today's information society.

There is a very great need for more compact and higher capacity lithium-ion secondary batteries. Thus, electrodes formed of an alloy-based material of silicon, tin, or the like, instead of a carbon material such as graphite (black lead) which has been conventionally used as a negative electrode active material, have been actively developed. The graphite has a theoretical capacity of 372 mAh/g, whereas the negative electrode of silicon has a dramatically high theoretical capacity of 4200 mAh/g, and therefore silicon is an optimal material for higher capacity lithium-ion secondary batteries.

However, the material that is alloyed and dealloyed with lithium (e.g., silicon) greatly expands and contracts with reception and release of carrier ions in charge and discharge cycles; therefore, when the amount of carrier ions received by the material increases, the contact states between an active material and a conductive additive, between active materials, and between an active material and a current collector become worse and a conductive path is lost in some cases. The loss of the conductive path decreases the capacity as charge and discharge cycles increase. Moreover, in some cases, silicon is deformed or broken to be separated from a current collector or pulverized, so that a function as a lithium-ion secondary battery becomes difficult to maintain.

Patent Document 1 discloses a silicon layer that is formed over an uneven current collector so that a stress due to expansion or contraction of the silicon is reduced.

REFERENCE

Patent Document

[Patent Document 1] Japanese Published Patent Application No. 2013-235811

SUMMARY OF THE INVENTION

An object of one embodiment of the present invention is to provide a power storage device having high capacitance. Another object of one embodiment of the present invention is to provide a power storage device with excellent cycle characteristics. Another object of one embodiment of the present invention is to provide a power storage device with high charge and discharge efficiency. An object of one embodiment of the present invention is to provide a long-life power storage device.

An object of one embodiment of the present invention is to reduce or inhibit the decomposition reaction of an electrolytic solution, which speeds up at high temperature, and to prevent a decrease in charge and discharge capacity in charging and discharging at high temperature, in order to extend the operating temperature range of a power storage device. An object of one embodiment of the present invention is to provide a novel power storage device.

In the case where a power storage device such as a secondary battery is used in a flexible display device, a flexible electronic device, or the like, the power storage device is provided in a flexible portion (part or the whole of a housing). In this case, the power storage device is bent with the flexible portion, so that repeated change in the form of the power storage device might cause separation between a current collector and an active material in the power storage device. As a result, deterioration of the power storage device might be promoted.

Another object of one embodiment of the present invention is to prevent deterioration of a power storage device caused by change in its form.

Note that the descriptions of these objects do not disturb the existence of other objects. In one embodiment of the present invention, there is no need to achieve all the objects. Other objects will be apparent from and can be derived from the description of the specification, the drawings, the claims, and the like.

An embodiment of the present invention is an electrode including a current collector and an active material layer. The active material layer includes first to fourth layers. The second layer is provided between the first layer and the third layer. The third layer is provided between the second layer and the fourth layer. The first layer includes a region in contact with the current collector. The first layer includes a first element which is at least one element selected from Si, Mg, Ca, Ga, Al, Ge, Sn, Pb, Sb, Bi, Ag, Zn, Cd, As, Hg, and In. The third layer includes a second element which is at least one element selected from Si, Mg, Ca, Ga, Al, Ge, Sn, Pb, Sb, Bi, Ag, Zn, Cd, As, Hg, and In. The second layer includes the first element or the second element. The second layer includes at least one of oxygen, nitrogen, sulfur, phosphorus, and fluorine. The fourth layer includes the first element or the second element. The fourth layer includes at least one of oxygen, nitrogen, sulfur, phosphorus, and fluorine.

Note that the above current collector may be a negative electrode current collector and the above active material layer may be a negative electrode active material layer.

Another embodiment of the present invention is a negative electrode including a negative electrode current collector and a negative electrode active material layer, and the negative electrode active material layer is formed in such a manner that the first to fourth layers are stacked in this order. The first layer is provided in contact with the negative electrode current collector. The first layer and the third layer include at least one element selected from Si, Mg, Ca, Ga, Al, Ge, Sn, Pb, Sb, Bi, Ag, Zn, Cd, As, Hg, and In. The second layer and the fourth layer include any of oxide, nitride, sulfide, phosphide, and fluoride of the same element as the one included in the first layer and the third layer.

Note that the first layer and the third layer may include a region having a thickness less than 100 nm, preferably include a region having a thickness greater than or equal to 2 nm and less than or equal to 50 nm.

The second layer and the fourth layer may include a region having a thickness less than 120 nm, preferably include a region having a thickness greater than or equal to 1.6 nm and less than or equal to 60 nm.

Note that the first layer and the third layer may include amorphous silicon, and the second layer and the fourth layer may include oxygen and silicon.

Another embodiment of the present invention is a power storage device including any one of the negative electrodes having the above-described features. The power storage device includes a positive electrode and the negative electrode. The negative electrode includes a negative electrode current collector and the negative electrode active material layer. The negative electrode active material layer is between the negative electrode current collector and the positive electrode.

Another embodiment of the present invention is a power storage device including any one of the negative electrodes having the above-described features. The power storage device includes a positive electrode, the negative electrode, and an electrolyte. The negative electrode includes a negative electrode current collector and the negative electrode active material layer. The negative electrode active material layer is between the negative electrode current collector and the electrolyte.

Another embodiment of the present invention is an electronic device including any one of the above power storage devices and a display device, a microphone, a speaker, an operation button, a housing, or a sensor.

Another embodiment of the present invention is a vehicle including any one of the above power storage devices, and a steering wheel, or a display device.

One embodiment of the present invention can provide a power storage device having high capacitance. One embodiment of the present invention can provide a power storage device with excellent cycle characteristics. One embodiment of the present invention can provide a power storage device with high charge and discharge efficiency. One embodiment of the present invention can provide a long-life power storage device.

One embodiment of the present invention makes it possible to reduce or inhibit the decomposition reaction of an electrolytic solution, which speeds up at high temperature, and to prevent a decrease in charge and discharge capacity in charging and discharging at high temperature, so that the operating temperature range of a power storage device can be extended. One embodiment of the present invention can provide a novel power storage device.

One embodiment of the present invention can prevent deterioration of a power storage device caused by change in its form.

Note that the description of these effects does not disturb the existence of other effects. In one embodiment of the present invention, there is no need to obtain all the effects. Other effects will be apparent from and can be derived from the description of the specification, the drawings, the claims, and the like.

BRIEF DESCRIPTION OF THE DRAWINGS

In the accompanying drawings.

FIG. 10 shows a method for fabricating a thin storage battery;

FIGS. 18A1, 18A2, 18B1, and 18B2 each illustrate an example of a power storage system;

DETAILED DESCRIPTION OF THE INVENTION

Figure 1A:
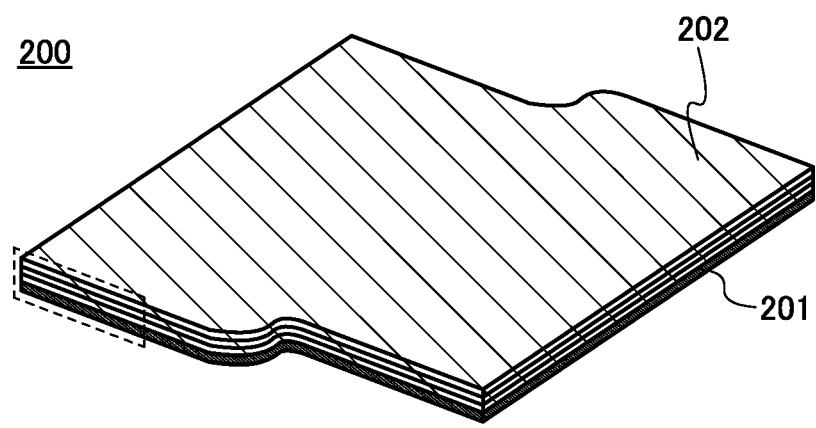
FIGS. 1A and 1B illustrate a negative electrode of one embodiment of the present invention.

Hereinafter, embodiments and examples of the present invention will be described in detail with reference to the accompanying drawings. However, the present invention is not limited to the descriptions of the embodiments and examples and it is easily understood by those skilled in the art that the mode and details can be changed variously. Accordingly, the present invention should not be interpreted as being limited to the content of the embodiments and examples below.

Note that in the drawings used in this specification, the sizes and thicknesses of components such as films, layers, substrates, and regions are exaggerated for simplicity in some cases. Therefore, the sizes of the components are not limited to the sizes in the drawings and relative sizes between the components.

Note that the ordinal numbers such as "first" and "second" in this specification and the like are used for convenience and do not denote the order of steps, the stacking order of layers, or the like. Therefore, for example, description can be made even when "first" is replaced with "second" or "third," as appropriate. In addition, the ordinal numbers in this specification and the like are not necessarily the same as those which specify one embodiment of the present invention.

Note that in structures of the present invention described in this specification and the like, the same portions or portions having similar functions are denoted by common reference numerals in different drawings, and descriptions thereof are not repeated. Further, the same hatching pattern is used for portions having similar functions, and the portions are not especially denoted by reference numerals in some cases.

Note that in this specification and the like, a positive electrode and a negative electrode for a power storage device may be collectively referred to as an electrode; the electrode in this case refers to at least one of the positive electrode and the negative electrode.

Note that the power storage device in this specification and the like indicates all elements and devices that have the function of storing electric power. For example, a storage battery such as a lithium-ion secondary battery, a lithium-ion capacitor, and an electric double layer capacitor are included in the category of the power storage device.

Here, a charge rate and a discharge rate will be described. For example, in the case of charging a secondary battery with a capacity of X [Ah] at a constant current, a charge rate of 1 C means the current value I [A], with which charging is terminated in exactly 1 hour, and a charge rate of 0.2 C means I/5 [A] (i.e., the current value with which charging is terminated in exactly 5 hours). Similarly, a discharge rate of 1 C means the current value I [A] with which discharging is terminated in exactly 1 hour, and a discharge rate of 0.2 C means I/5 [A] (i.e., the current value with which discharging is terminated in exactly 5 hours).

Note that the terms "film" and "layer" can be interchanged with each other depending on the case or circumstances. For example, the term "conductive layer" can be changed into the term "conductive film" in some cases, and the term "insulating film" can be changed into the term "insulating layer" in some cases.

Embodiment 1

In this embodiment, a negative electrode included in a power storage device is described.

An example of power storage devices includes a lithium-ion secondary battery. In the lithium-ion secondary battery, in the case where a material that is alloyed and dealloyed with lithium is used as a negative electrode active material, the capacity of the power storage device can be increased compared with the case where graphite is used as a negative electrode active material. For example, when graphite is used as a negative electrode active material, the theoretical capacity is 372 mAh/g. On the other hand, when silicon, which is a material that is alloyed and dealloyed with lithium, is used as a negative electrode active material, the theoretical capacity is 4200 mAh/g, which is over ten times as much as that of graphite.

However, a material that is alloyed and dealloyed with lithium (e.g., silicon) greatly expands and contracts with reception and release of carrier ions in charge and discharge cycles; therefore, deformation or a crack of a negative electrode active material layer would be caused. Then, the active material might be separated from a current collector or pulverized, which might lead to difficulty of maintaining a function for a power storage device. Pulverization means that a material is repeatedly broken into pieces because of expansion and contraction, for example. Pulverization causes separation of the negative electrode active material layer from a current collector, clogging in a separator, or attachment to a surface of a counter electrode, for example, which leads to deterioration of a power storage device.

The reaction potential of the negative electrode active material is preferably as low as possible, in which case the voltage of the power storage device can be high. On the other hand, when the voltage of the power storage device is low, power of reducing an electrolyte is increased, so that an organic solvent or the like in an electrolyte might be subjected to reductive decomposition. The range of potentials in which the electrolysis of an electrolyte does not occur is referred to as a potential window. The electrode potential of the negative electrode needs to be within a potential window of an electrolyte; however, the potentials of many active materials used for negative electrodes of lithium-ion secondary batteries and lithium-ion capacitors are out of the potential windows of almost all kinds of electrolytes. Specifically, materials with low reaction potentials, such as graphite and silicon, can increase the voltage of power storage devices but are likely to cause the reductive decomposition of electrolytes, which is problematic.

Note that in this specification and the like, an electrolytic solution including a solvent and salts is referred to as an electrolyte in some cases.

In view of the above, this embodiment provides a negative electrode included in a power storage device which has high capacity and hardly deteriorates by charge and discharge cycles.

[Structure of Negative Electrode]

Figure 1B:
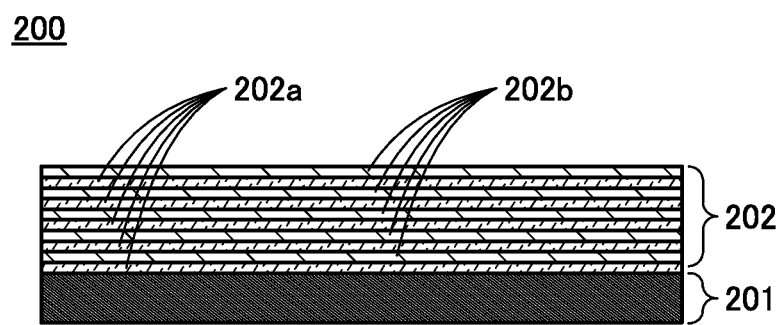

FIG. 1A is an overhead view of a negative electrode 200, and FIG. 1B is a cross-sectional view of a portion surrounded by a dashed line in FIG. 1A. The negative electrode 200 has a structure in which a negative electrode active material layer 202 is provided over a negative electrode current collector 201. Although the negative electrode active material layers 202 are provided over only one surface of the negative electrode current collector 201 in FIGS. 1A and 1B, the negative electrode active material layer 202 may be formed over both surfaces of the negative electrode current collector 201.

There is no particular limitation on the negative electrode current collector 201 as long as it has high conductivity without causing a significant chemical change in a power storage device. For example, the negative electrode current collector 201 can be formed using a metal such as stainless steel, gold, platinum, zinc, iron, nickel, copper, aluminum, titanium, tantalum, or manganese, an alloy thereof, sintered carbon, or the like. Alternatively, copper or stainless steel that is coated with carbon, nickel, titanium, or the like can be used. Alternatively, the negative electrode current collector 201 can be formed using an aluminum alloy to which an element which improves heat resistance, such as silicon, neodymium, scandium, or molybdenum, is added. Still alternatively, a metal element which forms silicide by reacting with silicon can be used. Examples of the metal element which forms silicide by reacting with silicon include zirconium, titanium, hafnium, vanadium, niobium, tantalum, chromium, molybdenum, tungsten, cobalt, nickel, and the like. The negative electrode current collector 201 can have any of various shapes including a foil-like shape, a plate-like shape (sheet-like shape), a net-like shape, a cylindrical shape, a coil shape, a punching-metal shape, an expanded-metal shape, a porous shape, and a shape of non-woven fabric as appropriate. The negative electrode current collector 201 may be formed to have micro unevenness on the surface thereof in order to enhance adhesion to the active material layer. The negative electrode current collector 201 preferably has a thickness of more than or equal to 5 μm and less than or equal to 30 μm.

The negative electrode active material layer 202 includes a first layer 202a and a second layer 202b as shown in FIG. 1B. The first layer 202a is in contact with a negative electrode current collector 201. The first layer 202a includes a negative electrode active material. The negative electrode active material is a material that reacts with carrier ions to be an alloy. The second layer 202b includes a material that has lower reactivity with carrier ions than that of the first layer 202a. That is, the second layer 202b has a function as a protective layer of the first layer 202a.

Note that an active material refers only to a material that relates to insertion and extraction of ions that are carriers. In this specification and the like, a material that is actually an "active material" and materials such as a conductive additive, a binder, and the like are collectively referred to as an active material layer.

The negative electrode active material layer 202 is preferably formed by stacking the first layer 202a and the second layer 202b alternately. That is, it is preferable that n first layers 202a and n second layers 202b be alternately stacked. Stacking n first layers 202a and n second layers 202b can increase charge and discharge capacity in the entire negative electrode active material layer 202.

The negative electrode active material layer 202 of this embodiment includes the first layer 202a containing a material that reacts with carrier ions to be an alloy and the second layer 202b placed between the first layer 202a and an electrolyte. The second layer 202b includes a material that has low reactivity with carrier ions. The resistance of the second layer 202b is higher than that of the first layer 202a. A capacity per unit weight or per unit volume of the second layer 202b is smaller than that of the first layer 202a. When the second layer 202b reacts with carrier ions, expansion and contraction due to the reaction with carrier ions in the second layer 202b are milder than those in the first layer 202a.

Compared with the case where the first layer 202a is in contact with the electrolyte, decomposition of the electrolyte can be inhibited in the case where the second layer 202b is in contact with the electrolyte because the resistance of the second layer 202b is higher than that of the first layer 202a. Compared with the first layer 202a, the second layer 202b has low reactivity with carrier ions and expansion and contraction are mild; therefore, the second layer 202b can reduce a stress change of the active material that is caused by the expansion and contraction in the first layer 202a.

First, a material of the first layer 202a and the second layer 202b is described.

The first layer 202a contains a material that reacts with carrier ions to be an alloy, typically a material that is alloyed with lithium. The first layer 202a preferably includes a material containing at least one of Si, Mg, Ca, Ga, Al, Ge, Sn, Pb, Sb, Bi, Ag, Zn, Cd, As, Hg, and In as the negative electrode active material. These elements each have a higher capacity than carbon. In particular, silicon has a high theoretical capacity of 4200 mAh/g. Therefore, silicon is preferably included in the first layer 202a.

The first layer 202a may contain $Mg_2Si$, $Mg_2Ge$, $Mg_2Sn$, $SnS_2$, $V_2Sn_3$, $FeSn_2$, $CoSn_2$, $Ni_3Sn_2$, $Cu_6Sn_5$, $Ag_3Sn$, $Ag_3Sb$, $Ni_2MnSb$, $CeSb_3$, $LaSn_3$, $La_3Co_2Sn_7$, $CoSb_3$, InSb, SbSn, or the like as the negative electrode active material.

Alternatively, the first layer 202a contains oxide such as titanium dioxide ($TiO_2$), lithium titanium oxide ($Li_4Ti_5O_{12}$), lithium-graphite intercalation compound ($Li_xC_6$), niobium pentoxide ($Nb_2O_5$), tungsten oxide ($WO_2$), or molybdenum oxide ($MoO_2$), or $Li_{3-x}M_xN$ (M=Co, Ni, or Cu) with a $Li_3N$ structure, which is a nitride containing lithium and a transition metal as the negative electrode active material.

A plurality of negative electrode active materials may be used for the first layer 202a. For example, the first layer 202a may include a region including a first element selected from Si, Mg, Ca, Ga, Al, Ge, Sn, Pb, Sb, Bi, Ag, Zn, Cd, As, Hg, and In and a region including a second element selected from these elements.

Note that when the first layer 202a contains silicon as a negative electrode active material, phosphorus, boron, or the like can be contained in order that the conductivity of the first layer 202a be increased. In this case, the concentration of phosphorus or boron in silicon is higher than or equal to $1\times10^{17}$ atoms/cm$^3$, preferably higher than or equal to $1\times10^{20}$ atoms/cm$^3$, whereby, the conductivity of the first layer 202a can be increased.

The second layer 202b includes a material that has lower reactivity with carrier ions than that of the first layer 202a. The second layer 202b preferably contains a compound including the same element as the one contained in the first layer 202a. For example, the second layer 202b preferably includes oxide, nitride, sulfide, phosphide, fluoride, or the like of the same element as the one contained in the first layer 202a.

For example, the first layer 202a may include at least one element selected from Si, Mg, Ca, Ga, Al, Ge, Sn, Pb, Sb, Bi, Ag, Zn, Cd, As, Hg, and In, and the second layer 202b may include oxide of the same element as the one included in the first layer 202a. For example, the first layer 202a may include silicon, and the second layer 202b may include silicon oxide. Alternatively, the first layer 202a may include tin, and the second layer 202b may include tin oxide.

In the case where the second layer 202b is formed using oxide of the same element as the one contained in the first layer 202a, the second layer 202b may contain carbon, fluorine, nitrogen, phosphorus, or the like as an impurity. In the case where the second layer 202b is formed using nitride of the same element as the one contained in the first layer 202a, the second layer 202b may contain carbon, oxygen, fluorine, phosphorus, or the like as an impurity. In the case where the second layer 202b is formed using sulfide of the same element as the one contained in the first layer 202a, the second layer 202b may contain carbon, oxygen, fluorine, nitrogen, phosphorus, or the like as an impurity. In the case where the second layer 202b is formed using phosphide of the same element as the one contained in the first layer 202a, the second layer 202b may contain carbon, oxygen, fluorine, nitrogen, or the like as an impurity. In the case where the second layer 202b is formed using fluoride of the same element as the one contained in the first layer 202a, the second layer 202b may contain carbon, nitrogen, phosphorus, or the like as an impurity.

The second layer 202b contains at least one of impurities of carbon, oxygen, fluorine, nitrogen, and phosphorus, whereby the resistance of the second layer 202b can be reduced. Consequently, the charge and discharge efficiency and the rate characteristics can be improved.

Note that when the first layer 202a and the second layer 202b contain at least one element selected from Si, Mg, Ca, Ga, Al, Ge, Sn, Pb, Sb, Bi, Ag, Zn, Cd, As, Hg, and In, the concentration of the element in the first layer 202a is preferably higher than that in the second layer 202b.

Next, the thickness of the first layer 202a and the second layer 202b is described.

It is preferable that the thickness of the first layer 202a is small, typically smaller than 100 nm, preferably larger than or equal to 2 nm and smaller than or equal to 50 nm, or further preferably larger than or equal to 5 nm and smaller than or equal to 20 nm.

When the thickness of the first layer 202a is reduced, a surface area per unit weight of the first layer 202a is increased. Meanwhile, a reaction between the electrolyte and the negative electrode active material occurs at the surface of the negative electrode active material. Therefore, as the surface area per unit weight of the first layer 202a increases, the amount of the reaction between the negative electrode active material and the electrolytic solution can be increased. Accordingly, the charge and discharge capacity of a power storage device can be increased.

As the first layer 202a is thinner, the stress due to expansion and contraction caused by a reaction with carrier ions can be reduced, for example. Therefore, a crack, deformation, or the like of the negative electrode active material by charging or discharging can be inhibited. In addition, a decrease in capacity caused by charge and discharge cycles can be inhibited. That is, a power storage device manufactured with the use of the negative electrode including the negative electrode active material layer can have a long lifetime.

It is preferable that the thickness of the second layer 202b be small, typically greater than or equal to 80% and less than or equal to 120% of that of the first layer 202a, and be less than 120 nm, preferably greater than or equal to 1.6 nm and less than or equal to 60 nm, or further preferably greater than or equal to 5 nm and less than or equal to 20 nm.

The second layer 202b has a higher resistance than the first layer 202a, and the resistance of the negative electrode active material layer 202 can be reduced by reducing the thickness of the second layer 202b, whereby the resistance of a battery can be reduced. Consequently, the charge and discharge efficiency and the rate characteristics can be improved.

The second layer 202b is provided over the surface of the first layer 202a, whereby the contact area between the first layer 202a and an electrolyte can be reduced. Accordingly, pulverization of the first layer 202a can be inhibited, and decomposition of the electrolyte can be inhibited.

The first layer 202a can have a crystal structure or an amorphous structure. Examples of the crystal structure are a single crystal structure, a polycrystalline structure, a microcrystalline structure, and the like. Note that it is preferable that the first layer 202a has an amorphous structure, in which case pulverization caused by charging and discharging can be inhibited The first layer 202a may be formed by stacking a crystal structure region and an amorphous structure region. In this case, the crystal structure region is in contact with a negative electrode current collector 201, whereby the contact resistance between the negative electrode current collector 201 and the negative electrode active material layer 202 can be reduced. Alternatively, the amorphous structure region is in contact with the negative electrode current collector 201, whereby the stress between the negative electrode current collector 201 and the negative electrode active material layer 202 can be reduced. Accordingly, the separation of the negative electrode active material layer 202 in charging and discharging can be prevented.

The first layer 202a may be formed by randomly arranging an amorphous structure region and a crystal structure region. Crystal structure regions may be dispersed in an amorphous structure region, for example.

Here, the planar shape of the second layer 202b is described with reference to FIGS. 2A to 2C. A negative electrode active material layer 202, which is formed in the following manner: first to n-th first layers 202a and first to n-th second layers 202b are alternately stacked from the negative electrode current collector 201 side, is described.

Figure 2A:
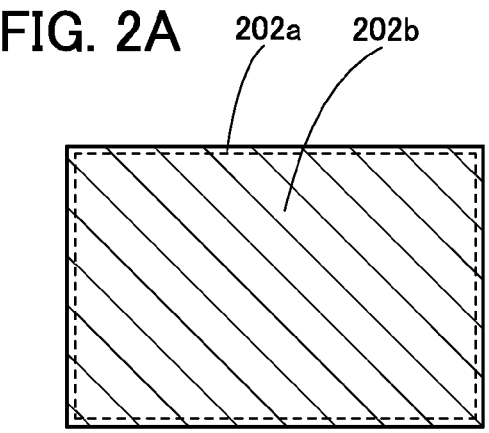
FIGS. 2A to 2C each illustrate a negative electrode of one embodiment of the present invention.

The second layer 202b shown in FIG. 2A covers the top surface and the side surface of the first layer 202a. That is, the second layer 202b covers the surface of the first layer 202a. It is preferable that the second layer 202b which is placed as the surface of the negative electrode active material layer 202 (that is, the n-th second layer) and the first layer 202a which is in contact with the n-th second layer (that is, the n-th first layer) have the structure shown in FIG. 2A because the first layer 202a including the negative electrode active material is not in contact with an electrolyte, and decomposition of the electrolyte can be inhibited.

Figure 2B:
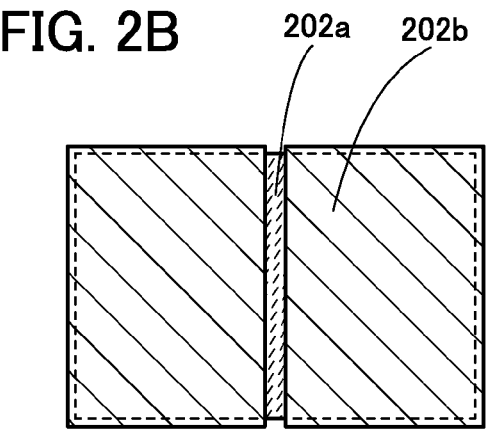

The second layer 202b shown in FIG. 2B is divided over the first layer 202a. A region where the second layer 202b is divided and the first layer 202a is exposed (hereinafter referred to as a dividing region) can have a belt-like shape shown in FIG. 2B, for example. Additionally, the dividing region can be not only the belt-like shape, but also a lattice-like shape, a rectangular shape, a shape having a curve, a circular shape, a polygonal shape, an amorphous shape, or the like.

Figure 2C:
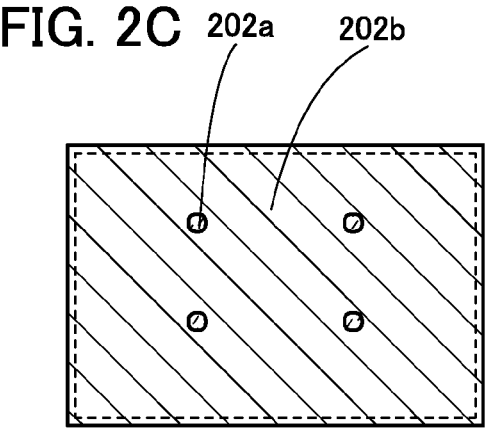

The second layer 202b shown in FIG. 2C has openings. The first layer 202a is exposed through the openings. The openings can have a rectangular shape, a polygonal shape, an amorphous shape, or the like, other than a circular shape shown in FIG. 2C. The openings may be arranged in the horizontal and vertical directions. That is, the second layer 202b can be in a lattice-like shape or a checkered pattern. Additionally, the openings of the second layer 202b can be randomly arranged.

Figure 3A:
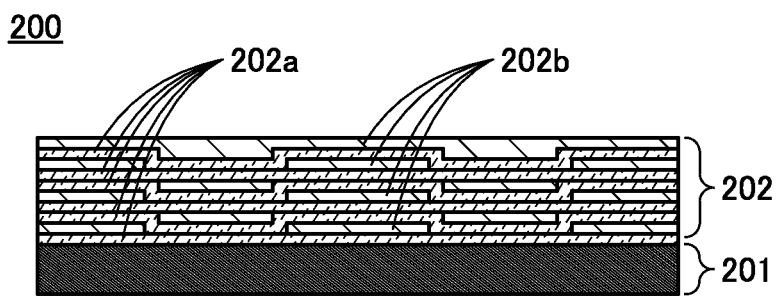
FIGS. 3A and 3B each illustrate a negative electrode of one embodiment of the present invention.
Figure 3B:
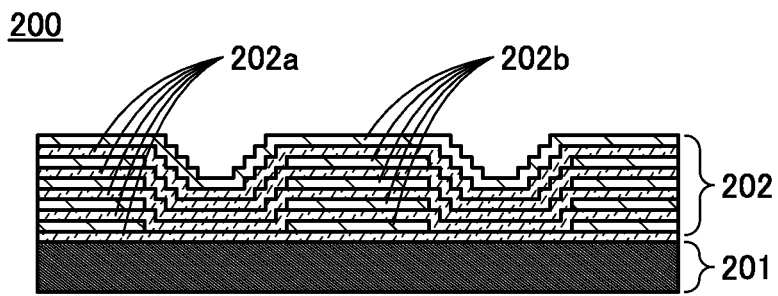

Note that FIGS. 3A and 3B show examples of a cross sectional view of the negative electrode active material layer 202 in which a plurality of the first layers 202a and a plurality of the second layers 202b including dividing regions or openings are stacked.

A negative electrode 200 shown in FIG. 3A includes a plurality of the second layers 202b in which the dividing regions or the openings are placed alternately. The negative electrode active material layer 202 shown in FIG. 3A can decrease depressions and projections of the surface. Therefore, in the negative electrode, a local current density rise can be inhibited and charge-discharge efficiency can be increased, which is preferable.

The negative electrode 200 shown in FIG. 3B includes a plurality of the second layers 202b in which the dividing regions or the openings are formed so as to overlap with each other. Note that, it is preferable that the surface of the negative electrode active material layer 202 be the second layer 202b which has no dividing regions or openings, that is, be the second layer 202b which covers the surface of the first layer 202a. Consequently, the first layer 202a is not in contact with an electrolyte; therefore, decomposition of the electrolyte can be inhibited.

[Method for Forming Negative Electrode]

An example of a method for forming the negative electrode 200 is described below. Here, a forming method of the negative electrode active material layer 202 where the first layer 202a is formed of an amorphous silicon layer and the second layer 202b is formed of a silicon oxide layer is explained.

The first layer 202a is formed over the negative electrode current collector 201 (the first film formation step).

The first layer 202a can be formed by an evaporation method, a sputtering method, a chemical vapor deposition (CVD) method, a pulsed laser deposition (PLD) method, an atomic layer deposition (ALD) method, or the like. Additionally, the first layer 202a can be formed by a sol-gel method, a liquid-phase deposition method, a dip coating method, an electrolytic precipitation method, a coating method, or the like. An evaporation method, a sputtering method, a CVD method, a PLD method, an ALD method, or the like makes it possible to form the first layer 202a that has a small thickness.

An amorphous silicon film containing phosphorus is formed as the first layer 202a by a plasma CVD method using a mixture of silane and phosphine (diluted with hydrogen) as a source gas.

Next, the second layer 202b is formed over the first layer 202a (the second film formation step).

The second layer 202b can be formed by the formation method of the first layer 202a as appropriate.

Note that when a silicon oxide layer is formed as the second layer 202b, a CVD method using an organosilane gas and oxygen makes it possible to mix carbon as an impurity into the silicon oxide layer. Examples of organosilane that can be used include silicon-containing compounds such as tetraethoxysilane (TEOS) (chemical formula: $Si(OC_2H_5)_4$), tetramethylsilane (TMS) (chemical formula: $Si(CH_3)_4$), trimethylsilane (chemical formula: $(CH_3)_3SiH$), tetramethylcyclotetrasiloxane (TMCTS), octamethylcyclotetrasiloxane (OMCTS), hexamethyldisilazane (HMDS), triethoxysilane (chemical formula: $SiH(OC_2H_5)_3$), and tris(dimethylamino)silane (chemical formula: $SiH(N(CH_3)_2)_3$).

The negative electrode active material layer 202 in which the first layers 202a and the second layers 202b are stacked alternately can be formed by repeating the first film formation step and the second film formation step sequentially. Furthermore, the negative electrode 200 can be formed.

The thickness of the negative electrode active material layer 202 formed in the above-described manner is preferably greater than or equal to 5 μm and less than or equal to 300 μm, or further preferably greater than or equal to 10 μm and less than or equal to 150 μm, for example. The amount of the active material in the negative electrode active material layer 202 is preferably greater than or equal to 1 mg/cm$^2$ and less than or equal to 30 mg/cm$^2$, for example.

This embodiment can be implemented in appropriate combination with any of the other embodiments.

Embodiment 2

In this embodiment, an example of a power storage device using the electrode shown in Embodiment 1 is described.
[Thin Storage Battery]

Figure 4:
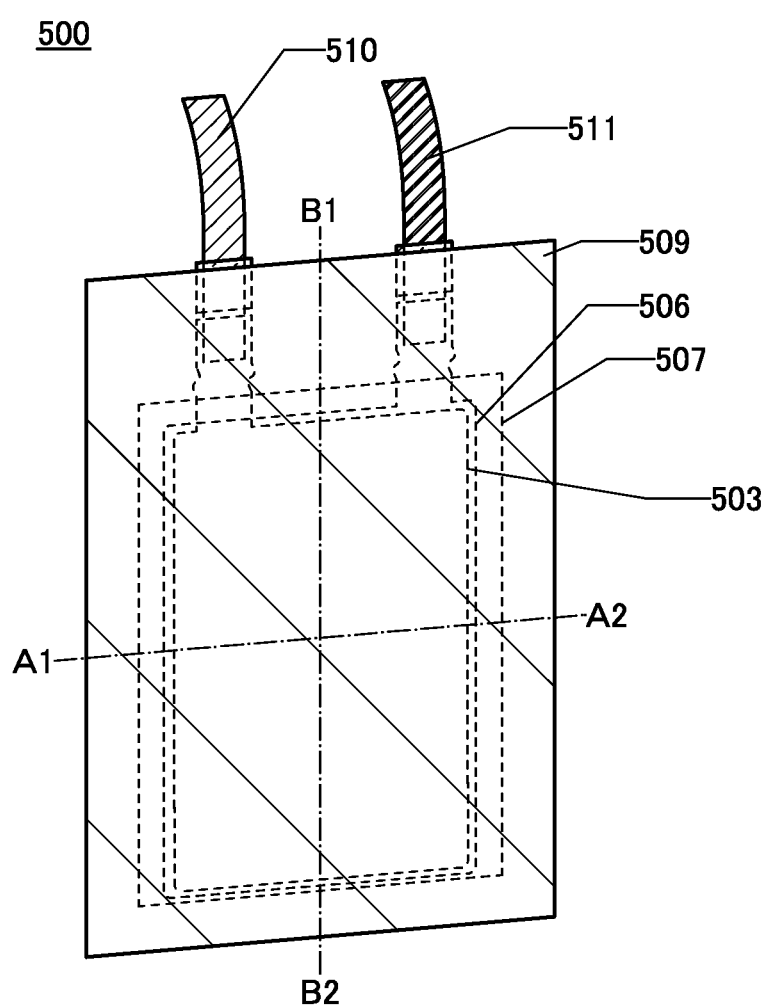
FIG. 4 is an external view of a thin storage battery.
Figure 5A:
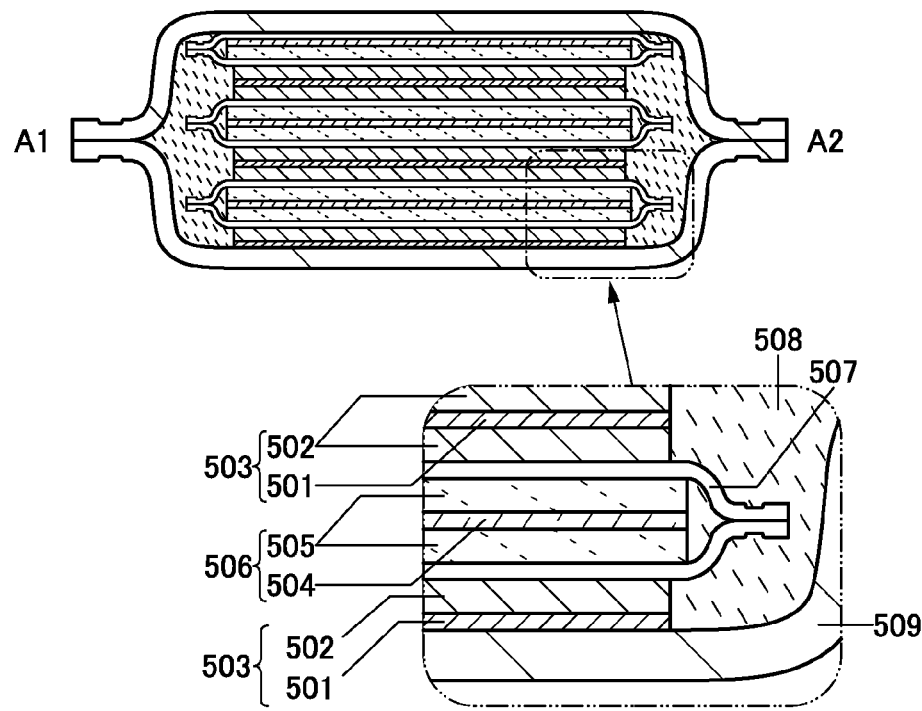
FIGS. 5A and 5B are cross sectional views of thin storage batteries.
Figure 5B:
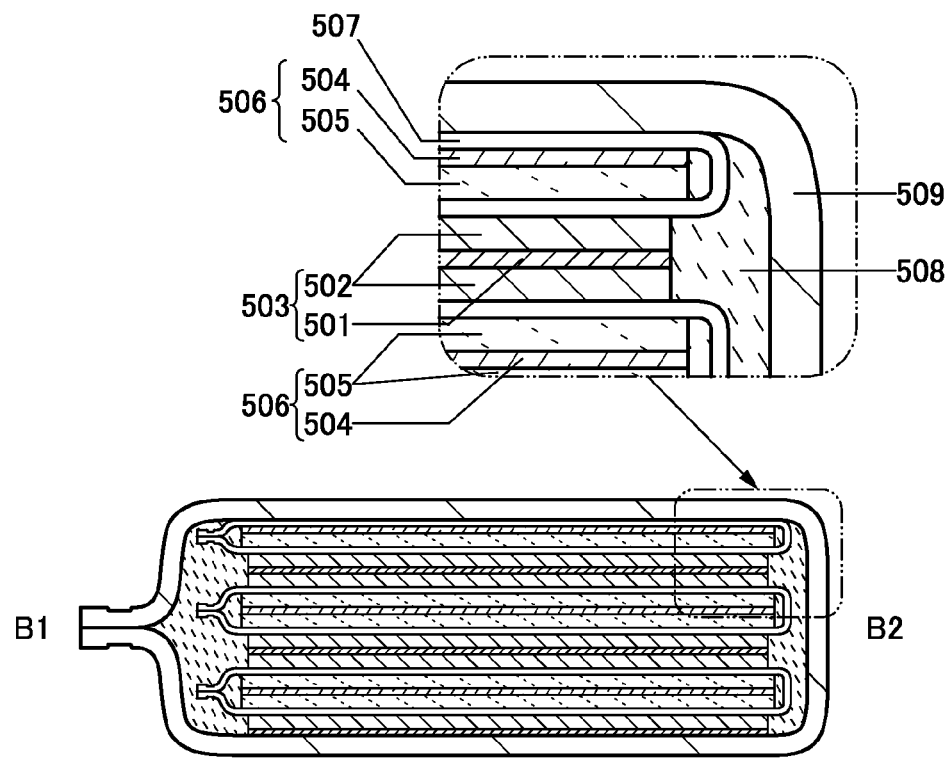

FIG. 4 and FIGS. 5A and 5B illustrate thin storage batteries as examples of power storage devices. When a flexible thin storage battery is used in an electronic device at least part of which is flexible, the storage battery can be bent as the electronic device is bent.

FIG. 4 illustrates the appearance of a thin storage battery 500. FIG. 5A is a cross-sectional view taken along dashed-dotted line A1-A2 in FIG. 4, and FIG. 5B is a cross-sectional view taken along dashed-dotted line B1-B2 in FIG. 4. The thin storage battery 500 includes a positive electrode 503 including a positive electrode current collector 501 and a positive electrode active material layer 502, a negative electrode 506 including a negative electrode current collector 504 and a negative electrode active material layer 505, a separator 507, an electrolytic solution 508, and an exterior body 509. The separator 507 is provided between the positive electrode 503 and the negative electrode 506 in the exterior body 509. The exterior body 509 is filled with the electrolytic solution 508.
[Operation of Storage Battery]

Here, operation of a storage battery will be described.

Here, the operating principle of a secondary battery is described using a lithium-ion secondary battery as an example. Here, for example, LiFePO$_4$ and graphite are used as a positive electrode active material and a negative electrode active material, respectively.

Figure 6A:
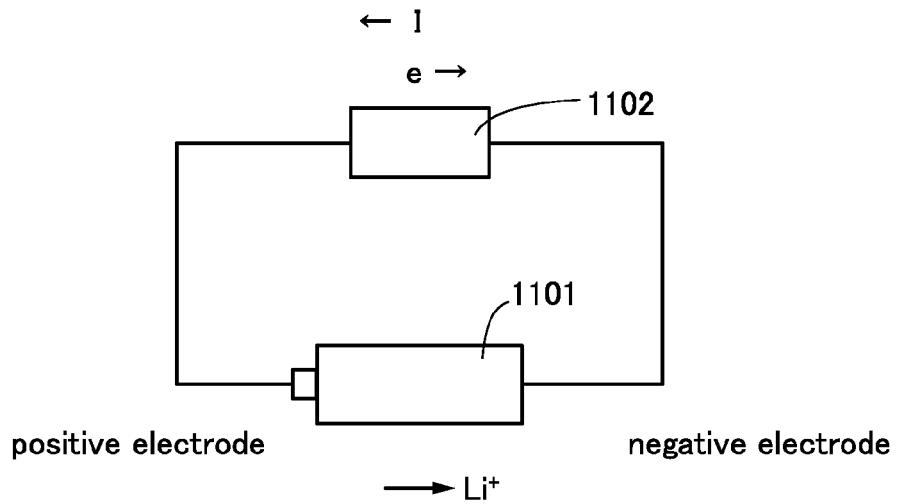
FIGS. 6A and 6B each show operation of a secondary battery.

FIG. 6A illustrates connections between a lithium-ion secondary battery 1101 and a charger 1102 when the lithium-ion secondary battery is charged. In the case of charging the lithium-ion secondary battery, a reaction expressed by Formula 1 occurs in a positive electrode.

[Formula 1]

In addition, a reaction expressed by Formula 2 occurs in a negative electrode.

[Formula 2]

Figure 6B:
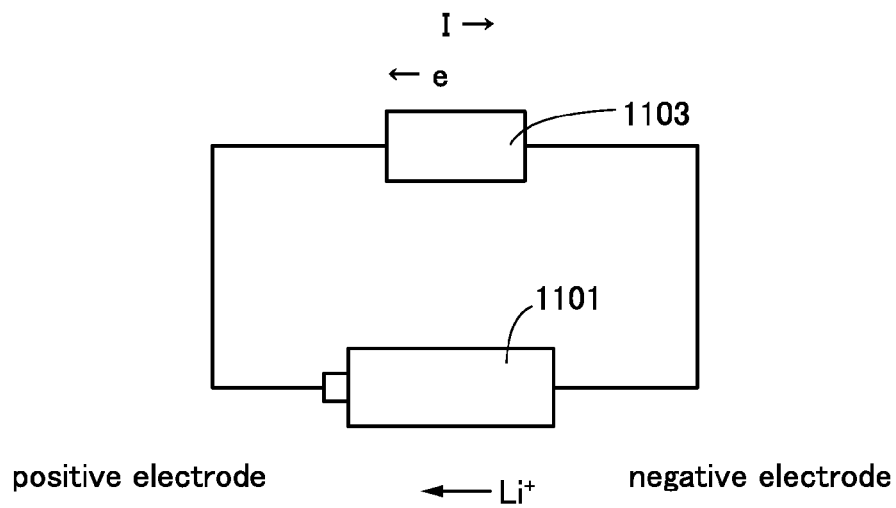

FIG. 6B illustrates connections between the lithium-ion secondary battery 1101 and a load 1103 in the case of discharging the lithium-ion secondary battery. In the case of discharging the lithium-ion secondary battery, a reaction expressed by Formula 3 occurs in the positive electrode.

[Formula 3]

In addition, a reaction expressed by Formula 4 occurs in the negative electrode.

[Formula 4]

Next, a structure of an electrode included in the power storage device 500 is described. For the negative electrode 506, the negative electrode shown in Embodiment 1 is preferably used.
[Structure of Positive Electrode]

Next, a structure of the positive electrode 503 will be described. The positive electrode 503 includes the positive electrode current collector 501 and the positive electrode active material layer 502.

There is no particular limitation on the positive electrode current collector 501 as long as it has high conductivity without causing a significant chemical change in a storage battery. For example, the positive electrode current collector 501 can be formed using a metal such as stainless steel, gold, platinum, zinc, iron, nickel, copper, aluminum, titanium, tantalum, or manganese, an alloy thereof, sintered carbon, or the like. Alternatively, copper or stainless steel that is coated with carbon, nickel, titanium, or the like can be used. Alternatively, the positive electrode current collector 501 can be formed using an aluminum alloy to which an element which improves heat resistance, such as silicon, neodymium, scandium, or molybdenum, is added. The positive electrode current collector 501 can have any of various shapes including a foil-like shape, a plate-like shape (sheet-like shape), a net-like shape, a cylindrical shape, a coil shape, a punching-metal shape, an expanded-metal shape, a porous shape, and a shape of non-woven fabric as appropriate. The positive electrode current collector 501 may be formed to have micro unevenness on the surface thereof in order to enhance adhesion to the active material layer. The positive electrode current collector 501 preferably has a thickness of more than or equal to 5 μm and less than or equal to 30 μm.

The positive electrode active material layer 502 contains a positive electrode active material. As described above, an active material refers only to a material that relates to insertion and extraction of ions that are carriers. In this specification and the like, a material that is actually an "active material" and materials such as a conductive additive, a binder, and the like are collectively referred to as an active material layer.

As the positive electrode active material, a material into and from which lithium ions can be inserted and extracted can be used; for example, a material having an olivine crystal structure, a layered rock-salt crystal structure, a spinel crystal structure, or a NASICON crystal structure, or the like can be used.

As the positive electrode active material, a compound such as $LiFeO_2$, $LiCoO_2$, $LiNiO_2$, $LiMn_2O_4$, $V_2O_5$, $Cr_2O_5$, or $MnO_2$ can be used, for example.

Further, lithium-containing complex phosphate having an olivine crystal structure (general formula: $LiMPO_4$, M is one or more of Fe(II), Mn(II), Co(II), and Ni(II)) can be used. Typical examples of $LiMPO_4$ (general formula) are lithium metal phosphate compounds such as $LiFePO_4$, $LiNiPO_4$, $LiCoPO_4$, $LiMnPO_4$, $LiFe_aNi_bPO_4$, $LiFe_aCo_bPO_4$, $LiFe_aMn_bPO_4$, $LiNi_aCo_bPO_4$, $LiNi_aMn_bPO_4$ (a+b≤1, 0<a<1, and 0<b<1), $LiFe_cNi_dCo_ePO_4$, $LiFe_cNi_dMn_ePO_4$, $LiNi_cCo_dMn_ePO_4$ (c+d+e≤1, 0<c<1, 0<d<1, and 0<e<1), and $LiFe_fNi_gCo_hMn_iPO_4$ (f+g+h+i≤1, 0<f<1, 0<g<1, 0<h<1, and 0<i<1).

Further, a lithium-containing complex silicate such as $Li_{(2-j)}MSiO_4$ (general formula, M is one or more of Fe(II), Mn(II), Co(II), and Ni(II) and 0≤j≤2) can be used. Typical examples of $Li_{(2-j)}MSiO_4$, general formula, are lithium silicate compounds such as $Li_{(2-j)}FeSiO_4$, $Li_{(2-j)}NiSiO_4$, $Li_{(2-j)}CoSiO_4$, $Li_{(2-j)}MnSiO_4$, $Li_{(2-j)}Fe_kNi_lSiO_4$ $Li_{(2-j)}Fe_kCo_lSiO_4$, $Li_{(2-j)}Fe_kMn_lSiO_4$, $Li_{(2-j)}Ni_kCo_lSiO_4$, $Li_{(2-j)}Ni_kMn_lSiO_4$, (k+l≤1, 0<k<1, and 0<l<1), $Li_{(2-j)}Fe_mNi_nCo_qSiO_4$, $Li_{(2-j)}Fe_mNi_nMn_qSiO_4$, $Li_{(2-j)}Ni_mCo_nMn_qSiO_4$ (m+n+q≤1, 0<m<1, 0<n<1, and 0<q<1), and $Li_{(2-j)}Fe_rNi_sCo_tMn_uSiO_4$ (r+s+t+u≤1, 0<r<1, 0<s<1, 0<t<1, and 0<u<1).

Still alternatively, a NASICON compound represented by a general formula, $AxM_2(XO_4)_3$ (A is Li, Na, or Mg, M is Fe, Mn, Ti, V, Nb, or Al, and X is S, P, Mo, W, As, or Si), can be used as the positive electrode active material. Examples of the NASICON compound are $Fe_2(MnO_4)_3$, $Fe2(SO_4)_3$, and $Li_3Fe_2(PO_4)_3$. Further alternatively, a compound represented by general formulae, $Li_2MPO_4F$, $Li_2MP_2O_7$, or $Li_5MO_4$ (M=Fe or Mn), a perovskite fluoride such as $NaF_3$ and $FeF_3$, a metal chalcogenide (a sulfide, a selenide, or a telluride) such as $TiS_2$ and $MoS_2$, a material with an inverse spinel crystal structure such as $LiMVO_4$, a vanadium oxide ($V_2O_5$, $V_6O_{13}$, $LiV_3O_8$, or the like), a manganese oxide, an organic sulfur compound, or the like can be used as the positive electrode active material.

In the case where carrier ions are alkali metal ions other than lithium ions, or alkaline-earth metal ions, a compound containing carriers such as an alkali metal (e.g., sodium and potassium) or an alkaline-earth metal (e.g., calcium, strontium, barium, beryllium, and magnesium) instead of lithium of the lithium compound, the lithium-containing complex phosphate, or the lithium-containing complex silicate may be used as the positive electrode active material.

The average particle size of the positive electrode active material is preferably, for example, larger than or equal to 5 nm and smaller than or equal to 50 μm.

For example, lithium-containing complex phosphate having an olivine crystal structure used for the positive electrode active material has a one-dimensional lithium diffusion path, so that lithium diffusion is slow. The average particle size of the active material is thus preferably, for example, larger than or equal to 5 nm and smaller than or equal to 1 μm in order to increase speed of charging and discharging. The specific surface area of the active material is, for example, preferably greater than or equal to 10 $m^2/g$ and less than or equal to 50 $m^2/g$.

A positive electrode active material having an olivine crystal structure is much less likely to be changed in the crystal structure by charge and discharge and has a more stable crystal structure than, for example, an active material having a layered rock-salt crystal structure. Thus, a positive electrode active material having an olivine crystal structure is stable toward operation such as overcharge. The use of such a positive electrode active material allows fabrication of a highly safe storage battery.

The positive electrode active material layer 502 may include a conductive additive. Examples of the conductive additive include natural graphite, artificial graphite such as mesocarbon microbeads, and carbon fiber. Examples of carbon fiber include mesophase pitch-based carbon fiber, isotropic pitch-based carbon fiber, carbon nanofiber, and carbon nanotube. Carbon nanotube can be formed by, for example, a vapor deposition method. Other examples of the conductive additive include carbon materials such as carbon black (acetylene black (AB), or the like) and graphene. Alternatively, metal powder or metal fibers of copper, nickel, aluminum, silver, gold, or the like, a conductive ceramic material, or the like can be used.

The positive electrode active material layer 502 may include a binder. As the binder, a material such as polyimide, polyvinylidene fluoride (PVdF), polystyrene, poly(methyl acrylate), poly(methyl methacrylate) (PMMA), sodium polyacrylate, polyvinyl alcohol (PVA), polyethylene oxide (PEO), polypropylene oxide, polyvinyl chloride, polytetrafluoroethylene, polyethylene, polypropylene, isobutylene, polyethylene terephthalate, nylon, or polyacrylonitrile (PAN) can be used.

As the binder, water-soluble polymers can be used. As the water-soluble polymers, a polysaccharide or the like can be used. As the polysaccharide, a cellulose derivative such as carboxymethyl cellulose (CMC), methyl cellulose, ethyl cellulose, hydroxypropyl cellulose, diacetyl cellulose, or regenerated cellulose, starch, or the like can be used.

As the binder, a rubber material such as styrene-butadiene rubber (SBR), styrene-isoprene-styrene rubber, acrylonitrile-butadiene rubber, butadiene rubber, or ethylene-propylene-diene copolymer can be used. Any of these rubber materials is more preferably used in combination with the aforementioned water-soluble polymers.

A single binder may be used or plural kinds of binders may be used in combination.

Here, the positive electrode active material layer 502 may contain graphene. Graphene is capable of making low-resistance surface contact and has extremely high conductivity even with a small thickness. Therefore, even a small amount of graphene can efficiently form a conductive path in an active material layer.

Note that graphene in this specification includes single-layer graphene and multilayer graphene including two to hundred layers. Single-layer graphene refers to a one-atom-thick sheet of carbon molecules having π bonds. Graphene oxide refers to a compound formed by oxidation of such graphene and is a plurality of graphenes in which the interlayer distance between adjacent single-layer graphenes is greater than 0.34 nm and less than or equal to 0.5 nm. When graphene oxide is reduced to form graphene, oxygen contained in the graphene oxide is not entirely released and part of the oxygen remains in the graphene. When graphene contains oxygen, the proportion of oxygen in the graphene, which is measured by X-ray photoelectron spectroscopy (XPS), is higher than or equal to 2% and lower than or equal to 20%, preferably higher than or equal to 3% and lower than or equal to 15%.

In the case where an active material with a small average particle size (e.g., 1 μm or less) is used, the specific surface area of the active material is large and thus more conductive paths for the active material particles are needed. In such a case, it is particularly preferred that graphene with extremely high conductivity that can efficiently form a conductive path even in a small amount be used.

Note that the above-described lithium-containing complex phosphate having an olivine crystal structure can be given as an example of the active material with a small average particle size.

Figure 7:
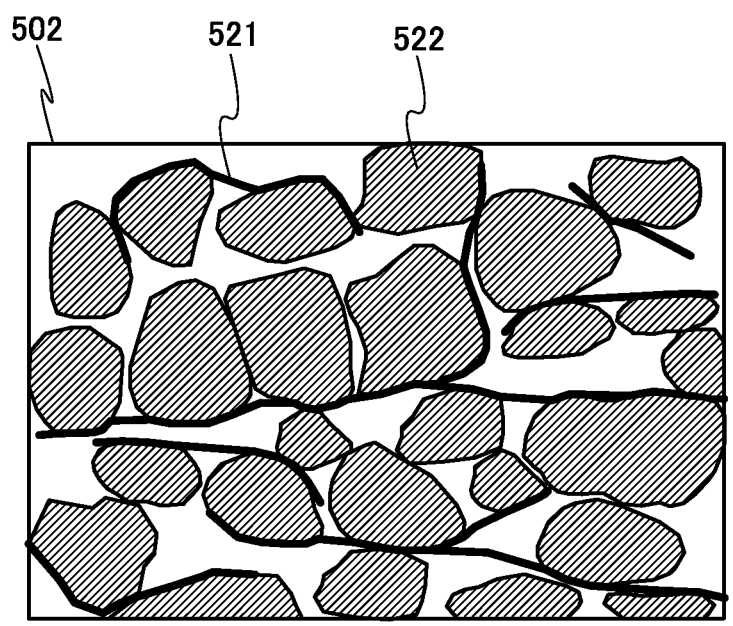
FIG. 7 illustrates an electrode of one embodiment of the present invention.

FIG. 7 is a longitudinal cross-sectional view of the positive electrode active material layer 502 in the case of using graphene as the conductive additive. The positive electrode active material layer 502 includes positive electrode active material particles 522, graphene flakes 521 as the conductive additive, and the binder (not illustrated in the drawing).

The longitudinal section of the positive electrode active material layer 502 of FIG. 7 shows substantially uniform dispersion of the graphene flakes 521 in the positive electrode active material layer 502. The graphene flakes 521 are schematically shown by thick lines in FIG. 7 but are actually thin films each having a thickness corresponding to the thickness of a single layer or a multi-layer of carbon molecules. The plurality of graphene flakes 521 are formed in such a way as to wrap, coat, or adhere to the surfaces of the plurality of positive electrode active material particles 522, so that the graphene flakes 521 make surface contact with the positive electrode active material particles 522. Furthermore, the graphene flakes 521 are also in surface contact with each other; consequently, the plurality of graphene flakes 521 form a three-dimensional network for electric conduction.

This is because graphene oxide with extremely high dispersibility in a polar solvent is used for the formation of the graphene flakes 521. The solvent is removed by volatilization from a dispersion medium in which graphene oxide is uniformly dispersed, and the graphene oxide is reduced to graphene; hence, the graphene flakes 521 remaining in the positive electrode active material layer 502 partly overlap with each other and are dispersed such that surface contact is made, thereby forming an electrical conduction path.

Unlike a conventional conductive additive in the form of particles, such as acetylene black, which makes point contact with an active material, the graphene flake 521 is capable of making low-resistance surface contact; accordingly, the electrical conduction between the positive electrode active material particles 522 and the graphene flakes 521 can be improved without an increase in the amount of a conductive additive. Thus, the proportion of the positive electrode active material particles 522 in the positive electrode active material layer 502 can be increased. Accordingly, the discharge capacity of a storage battery can be increased.

[Method for Forming Positive Electrode]

Next, a method for forming the positive electrode 503 is described.

In order to form the positive electrode active material layer 502, slurry is formed first. The slurry can be formed in such a manner that a conductive additive, a binder, and the like are added to the positive electrode active material and mixed with a solvent, for example. As the solvent, for example, water or N-methyl-2-pyrrolidone (NMP) can be used. Water is preferably used in terms of the safety and cost.

The mixing can be performed with a mixer. Any of a variety of mixers can be used as the mixer. For example, a planetary mixer, a homogenizer, or the like can be used.

The positive electrode current collector 501 may be subjected to surface treatment. Examples of such surface treatment are corona discharge treatment, plasma treatment, and undercoat treatment. The surface treatment can increase the wettability of the positive electrode current collector 501 with respect to the slurry. In addition, the adhesion between the positive electrode current collector 501 and the positive electrode active material layer 502 can be increased.

Here, the "undercoat" refers to a film formed over a current collector before application of slurry onto the current collector for the purpose of reducing the interface resistance between an active material layer and the current collector or increasing the adhesion between the active material layer and the current collector. Note that the undercoat is not necessarily formed in a film shape, and may be formed in an island shape. In addition, the undercoat may serve as an active material to have capacity. For the undercoat, a carbon material can be used, for example. Examples of the carbon material include graphite, carbon black such as acetylene black and ketjen black (registered mark), and a carbon nanotube.

Then, the formed slurry is applied to the positive electrode current collector 501.

For the application, a slot die method, a gravure method, a blade method, or combination of any of them can be used, for example.

Then, the solvent contained in the slurry applied to the positive electrode current collector 501 is removed by a method such as ventilation drying or reduced pressure (vacuum) drying, whereby the positive electrode active material layer 502 is formed. This step is preferably performed with, for example, a hot wind at a temperature higher than or equal to 30° C. and lower than or equal to 160° C. Alternatively, a hot plate or the like may be used. There is no particular limitation on the atmosphere.

This obtained positive electrode active material layer 502 may be pressed by a compression method such as a roll press method or a flat plate press method so as to be consolidated.

Through the above steps, the positive electrode active material layer 502 can be formed.

The thickness of the positive electrode active material layer 502 formed in the above-described manner is preferably greater than or equal to 5 μm and less than or equal to 300 μm, or further preferably greater than or equal to 10 μm and less than or equal to 150 μm, for example. The amount of the active material in the positive electrode active material layer 502 is preferably greater than or equal to 2 mg/cm$^2$ and less than or equal to 50 mg/cm$^2$, for example.

Note that the positive electrode active material layers 502 may be formed over both surfaces of the positive electrode current collector 501, or the positive electrode active material layers 502 may be formed over only one surface of the positive electrode current collector 501. Alternatively, the positive electrode active material layers 502 may be formed such that part of the positive electrode current collector 501 is sandwiched therebetween.

Next, an example of a method for forming the positive electrode in which graphene is used as the conductive additive is described. First, the active material, the binder, and graphene oxide are prepared. Note that an example of forming the positive electrode is shown here.

The graphene oxide is a raw material of the graphene flakes 521 that serves as a conductive additive later. Graphene oxide can be formed by various synthesis methods such as a Hummers method, a modified Hummers method, and oxidation of graphite. Note that a method for forming a storage battery electrode of the present invention is not limited by the degree of separation of graphene oxide.

For example, the Hummers method is a method for forming graphite oxide by oxidizing graphite such as flake graphite. The obtained graphite oxide is graphite which is oxidized in places and thus to which a functional group such as a carbonyl group, a carboxyl group, or a hydroxyl group is bonded. In the graphite oxide, the crystallinity of the graphite is lost and the distance between layers is increased. Therefore, the layers can be easily separated by ultrasonic treatment or the like to obtain graphene oxide.

The length of one side (also referred to as a flake size) of the graphene oxide is greater than or equal to 50 nm and less than or equal to 100 μm, preferably greater than or equal to 800 nm and less than or equal to 20 μm. Particularly in the case where the flake size is smaller than the average particle size of the positive electrode active material particles 522, the surface contact with a plurality of the positive electrode active material particles 522 and connection between graphene flakes become difficult, resulting in difficulty in improving the electrical conductivity of the positive electrode active material layer 502.

A solvent is added to the graphene oxide, the active material, and the binder, and mixing is performed. As the solvent, water or a polar organic solvent such as N-methylpyrrolidone (NMP) or dimethylformamide can be used.

Note that graphene oxide may be contained at a proportion higher than or equal to 0.1 weight % and lower than or equal to 10 weight %, preferably higher than or equal to 0.1 weight % and lower than or equal to 5 weight %, further preferably higher than or equal to 0.2 weight % and lower than or equal to 1 weight % of the total weight of the mixture of the graphene oxide, the positive electrode active material, the conductive additive, and the binder. On the other hand, the graphene obtained after the positive electrode paste is applied to the current collector and reduction is performed may be contained at a proportion higher than or equal to 0.05 weight % and lower than or equal to 5 weight %, preferably higher than or equal to 0.05 weight % and lower than or equal to 2.5 weight %, further preferably higher than or equal to 0.1 weight % and lower than or equal to 0.5 weight % of the total weight of the positive electrode active material layer. This is because the weight of the graphene is reduced by almost half due to the reduction of the graphene oxide.

Note that a solvent may be further added after the mixing so that the viscosity of the mixture can be adjusted. The mixing and the addition of the polar solvent may be repeated plural times. By the above steps, the slurry to be applied to the electrode is obtained.

Next, the obtained slurry is applied onto a current collector.

Then, the solvent contained in the slurry applied to the positive electrode current collector 501 is removed by a method such as ventilation drying or reduced pressure (vacuum) drying, whereby the positive electrode active material layer 502 is formed. This step is preferably performed using, for example, a hot wind at a temperature higher than or equal to 50° C. and lower than or equal to 160° C. There is no particular limitation on the atmosphere.

Next, reduction of the graphene oxide is preferably performed. The reduction is performed by heating treatment or with the use of a reducing agent, for example.

An example of a reducing method using a reducing agent will be described below. First, a reaction is caused in a solvent containing a reducing agent. Through this step, the graphene oxide contained in the active material layer is reduced to form the graphene flakes 521. Note that oxygen in the graphene oxide is not necessarily entirely released and possibly remains in the graphene partly. When graphene flakes 521 contains oxygen, the ratio of oxygen is higher than or equal to 2% and lower than or equal to 20%, preferably higher than or equal to 3% and lower than or equal to 15%. This reduction treatment is preferably performed at higher than or equal to room temperature and lower than or equal to 150° C.

Examples of the reducing agent are ascorbic acid, hydrazine, dimethyl hydrazine, hydroquinone, sodium boron hydride ($NaBH_4$), tetra butyl ammonium bromide (TBAB), $LiAlH_4$, ethylene glycol, polyethylene glycol, N,N-diethylhydroxylamine, and a derivative thereof.

A polar solvent can be used as the solvent. Any material can be used for the polar solvent as long as it can dissolve the reducing agent. Examples of the material of the polar solvent are water, methanol, ethanol, acetone, tetrahydrofuran (THF), dimethylformamide (DMF), N-methylpyrrolidone (NMP), dimethyl sulfoxide (DMSO), and a mixed solution of any two or more of the above.

After that, washing and heating are performed. The heating is preferably performed under a reduced pressure (in vacuum) or in a reduction atmosphere. This step is preferably performed, for example, in vacuum at a temperature higher than or equal to 50° C. and lower than or equal to 160° C. for longer than or equal to 10 minutes and shorter than or equal to 48 hours. The step allows sufficient evaporation, volatilization, or removal of the polar solvent and moisture in the positive electrode active material layer 502. The heating may be followed by pressing.

Alternatively, the solvent contained in the positive electrode active material layer 502 may be removed with a drying furnace or the like. In the case of using a drying furnace, the drying is performed at 30° C. or higher and 200° C. or lower for longer than or equal to 30 seconds and shorter than or equal to 20 minutes, for example. The temperature may be increased in stages.

Note that heating can facilitate the reduction reaction induced using the reducing agent. After graphene oxide is reduced with a reducing agent and the solvent is removed by heating, heating may further be performed.

In the case of not performing reduction with the use of a reducing agent, reduction can be performed by heating treatment. For example, reduction by heating treatment can be performed under a reduced pressure (in vacuum) at a temperature higher than or equal to 150° C. for longer than or equal to 0.5 hours and shorter than or equal to 30 hours.

Through the above steps, the positive electrode active material layer 502 in which the graphene flakes 521 are uniformly dispersed in the positive electrode active material particles 522 can be formed.

Here, reduction of graphene oxide is preferably performed on an electrode using graphene oxide. It is more preferred that reduction with a reducing agent be performed and then reduction by heating treatment be performed. In reduction by heating, oxygen atoms are released in the form of, for example, carbon dioxide. In contrast, reduction using a chemical reaction with a reducing agent can increase the proportion of carbon atoms that form a double bond in graphene. Furthermore, reduction by heating is preferably performed after reduction with a reducing agent because the conductivity of formed graphene can be further increased.

[Other Components]

As a solvent of the electrolytic solution 508, an aprotic organic solvent is preferably used. For example, one of ethylene carbonate (EC), propylene carbonate (PC), butylene carbonate, chloroethylene carbonate, vinylene carbonate, γ-butyrolactone, γ-valerolactone, dimethyl carbonate (DMC), diethyl carbonate (DEC), ethyl methyl carbonate (EMC), methyl formate, methyl acetate, methyl butyrate, 1,3-dioxane, 1,4-dioxane, dimethoxyethane (DME), dimethyl sulfoxide, diethyl ether, diglyme, acetonitrile, benzonitrile, tetrahydrofuran, sulfolane, and sultone can be used, or two or more of these solvents can be used in an appropriate combination in an appropriate ratio.

When a gelled high-molecular material is used as the solvent for the electrolytic solution, safety against liquid leakage and the like is improved. Further, a secondary battery can be thinner and more lightweight. Typical examples of the gelled high-molecular material include a silicone gel, an acrylic gel, an acrylonitrile gel, a poly(ethylene oxide)-based gel, a polypropylene oxide)-based gel, a gel of a fluorine-based polymer, and the like.

Alternatively, the use of one or more of ionic liquids (room temperature molten salts) which are less likely to burn and volatilize as the solvent for the electrolytic solution can prevent the power storage device from exploding or catching fire even when the power storage device internally shorts out or the internal temperature increases due to overcharging or the like. An ionic liquid is composed of a cation and an anion, and includes an organic cation and an anion. Examples of the organic cation used for the electrolytic solution are aliphatic onium cations, such as a quaternary ammonium cation, a tertiary sulfonium cation, and a quaternary phosphonium cation, and aromatic cations, such as an imidazolium cation and a pyridinium cation. Examples of the anion used for the electrolytic solution include a monovalent amide-based anion, a monovalent methide-based anion, a fluorosulfonate anion, a perfluoroalkylsulfonate anion, tetrafluoroborate, perfluoroalkylborate, hexafluorophosphate, and perfluoroalkylphosphate.

In the case of using a lithium ion as a carrier ion, as an electrolyte dissolved in the above-described solvent, one of lithium salts such as $LiPF_6$, $LiClO_4$, $LiAsF_6$, $LiBF_4$, $LiAlCl_4$, LiSCN, LiBr, LiI, $Li_2SO_4$, $Li_2B_{10}Cl_{10}$, $Li_2B_{12}Cl_{12}$, $LiCF_3SO_3$, $LiC_4F_9SO_3$, $LiC(CF_3SO_2)_3$, $LiC(C_2F_5SO_2)_3$, $LiN(CF_3SO_2)_2$, $LiN(C_4F_9SO_2)(CF_3SO_2)$, and $LiN(C_2F_5SO_2)_2$ can be used, or two or more of these lithium salts can be used in an appropriate combination in an appropriate ratio.

The electrolytic solution used for the storage battery is preferably a highly purified one so as to contain a negligible amount of dust particles and elements other than the constituent elements of the electrolytic solution (hereinafter, also simply referred to as impurities). Specifically, the proportion of the weight of impurities to the electrolytic solution is less than or equal to 1%, preferably less than or equal to 0.1%, and further preferably less than or equal to 0.01%.

Furthermore, an additive agent such as vinylene carbonate, propane sultone (PS), tert-butylbenzene (TBB), fluoroethylene carbonate (FEC), or LiBOB may be added to the electrolytic solution. The concentration of such an additive agent in the whole solvent is, for example, higher than or equal to 0.1 wt % and lower than or equal to 5 wt %.

Alternatively, a gelled electrolyte obtained in such a manner that a polymer is swelled with an electrolytic solution may be used. Examples of the gelled electrolyte (polymer-gel electrolyte) include a host polymer which is used as a support and contains the electrolytic solution described above.

Examples of the host polymer are explained below. Examples of the host polymer include a polymer having a polyalkylene oxide structure, such as polyethylene oxide (PEO); PVDF; polyacrylonitrile; and a copolymer containing any of them. For example, PVDF-HFP, which is a copolymer of PVDF and hexafluoropropylene (HFP) can be used. The formed polymer may be porous.

Instead of the electrolytic solution, a solid electrolyte including an inorganic material such as a sulfide-based inorganic material or an oxide-based inorganic material, or a solid electrolyte including a macromolecular material such as a polyethylene oxide (PEO)-based macromolecular material may alternatively be used. In the case of using the solid electrolyte, a separator or a spacer is not necessary. Further, the battery can be entirely solidified; therefore, there is no possibility of liquid leakage and thus the safety of the battery is dramatically increased.

As the separator 507, paper; nonwoven fabric; glass fiber; ceramics; synthetic fiber containing nylon (polyamide), vinylon (polyvinyl alcohol-based fiber), polyester, acrylic, polyolefin, or polyurethane; or the like can be used.

[Fabricating Method of Storage Battery]

Figure 8A:
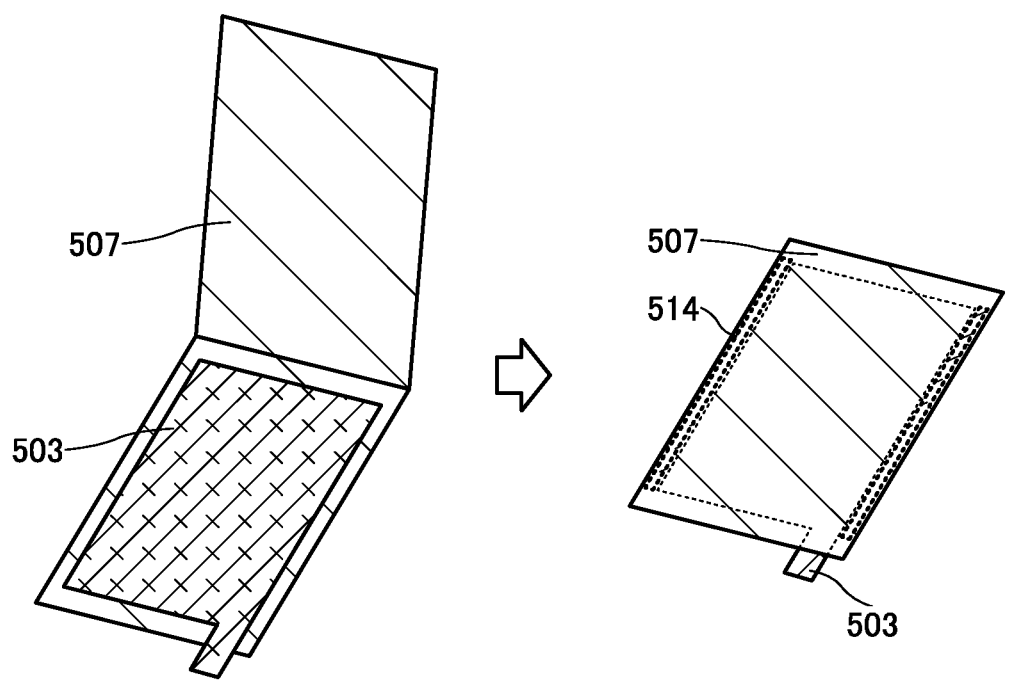
FIGS. 8A and 8B show a method for fabricating a thin storage battery.
Figure 8B:
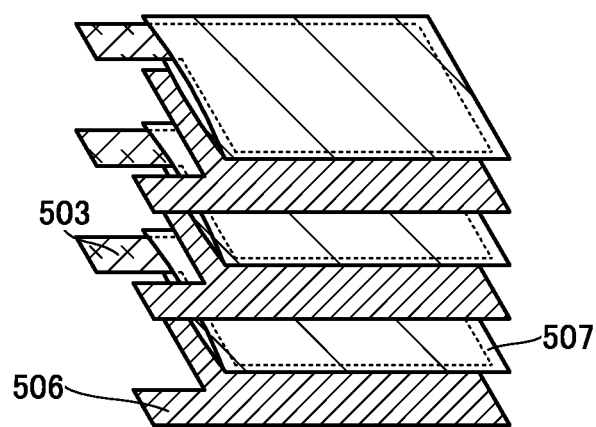

A method for fabricating the storage battery is described below. The separator 507 is preferably formed to have a bag-like shape to surround one of the positive electrode 503 and the negative electrode 506. For example, as illustrated in FIG. 8A, the separator 507 is folded in two such that the positive electrode 503 is sandwiched, and sealed with a sealing member 514 in a region outside the region overlapping with the positive electrode 503; thus, the positive electrode 503 can be surely surrounded by the separator 507. Then, as illustrated in FIG. 8B, the positive electrodes 503 surrounded by the separators 507 and the negative electrodes 506 are alternately stacked and provided in the exterior body 509, whereby the thin storage battery 500 can be formed.

Figure 9A:
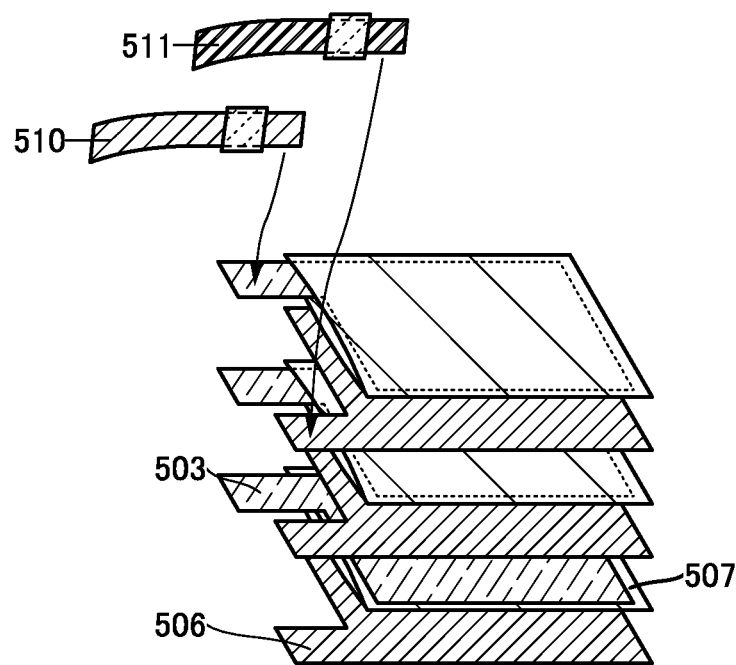
FIGS. 9A and 9B show a method for fabricating a thin storage battery.
Figure 9B:
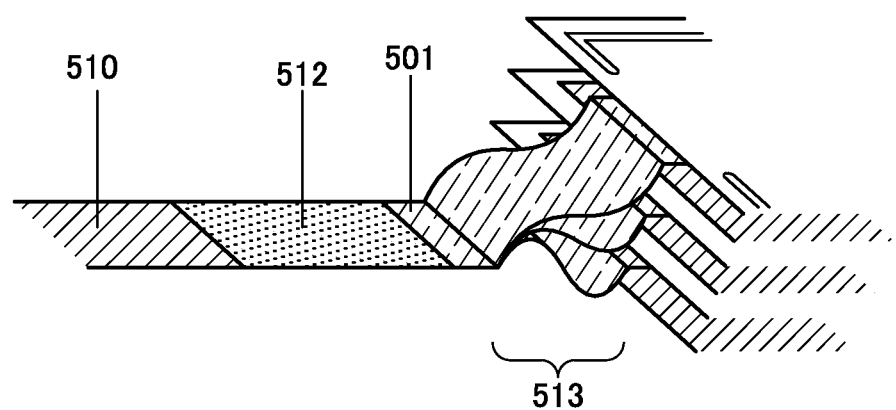

FIG. 9B illustrates an example in which a current collector is welded to a lead electrode, specifically, an example where positive electrode current collectors 501 are welded to a positive electrode lead electrode 510. The positive electrode current collectors 501 are welded to the positive electrode lead electrode 510 in a welding region 512 by ultrasonic welding or the like. The positive electrode current collector 501 includes a bent portion 513 as illustrated in FIG. 9B, and it is therefore possible to relieve stress due to external force applied after fabrication of the storage battery 500. The reliability of the storage battery 500 can be thus increased.

In a method for fabricating the thin storage battery 500 illustrated in FIGS. 8A and 8B and FIGS. 9A and 9B, the positive electrode current collectors 501 and the negative electrode current collectors 504 are welded to the positive electrode lead electrode 510 and a negative electrode lead electrode 511, respectively, by ultrasonic welding. As shown in FIG. 4, part of the positive electrode lead electrode 510 and part of the negative electrode lead electrode 511 are exposed outside. Alternatively, the positive electrode current collector 501 and the negative electrode current collector 504 can double as terminals for electrical contact with the outside. In that case, the positive electrode current collector 501 and the negative electrode current collector 504 may be arranged such that part of the positive electrode current collector 501 and part of the negative electrode current collector 504 are exposed outside the exterior body 509 without using lead electrodes.

Although the positive electrode lead electrode 510 and the negative electrode lead electrode 511 are provided on the same side in FIG. 4, the positive electrode lead electrode 510 and the negative electrode lead electrode 511 may be provided on different sides as illustrated in FIG. 10. The lead electrodes of a storage battery of one embodiment of the present invention can be freely positioned as described above; therefore, the degree of freedom in design is high. Accordingly, a product including a storage battery of one embodiment of the present invention can have a high degree of freedom in design. Furthermore, production efficiency of products each including a storage battery of one embodiment of the present invention can be increased.

As the exterior body 509 in the thin storage battery 500, for example, a film having a three-layer structure in which a highly flexible metal thin film of aluminum, stainless steel, copper, nickel, or the like is provided over a film formed of a material such as polyethylene, polypropylene, polycarbonate, ionomer, or polyamide, and an insulating synthetic resin film of a polyamide-based resin, a polyester-based resin, or the like is provided as the outer surface of the exterior body over the metal thin film can be used.

In FIG. 8B and FIG. 9A, three pairs of a positive electrode and a negative electrode facing each other are illustrated as an example. Needless to say, the number of a pair of electrodes facing each other is not limited to three and may be more than three or less than three. In the case of a large number of electrode layers, the storage battery can have high capacity. In contrast, in the case of a small number of electrode layers, the storage battery can have small thickness and high flexibility.

In the above structure, the exterior body 509 of the secondary battery can change its form with a radius of curvature greater than or equal to 30 mm, preferably greater than or equal to 10 mm. The exterior body of the secondary battery is formed of one or two films. In the case of the secondary battery having a layered structure, a cross-sectional structure of the battery that is bent is surrounded by two curves of the film serving as the exterior body.

Figure 11A:
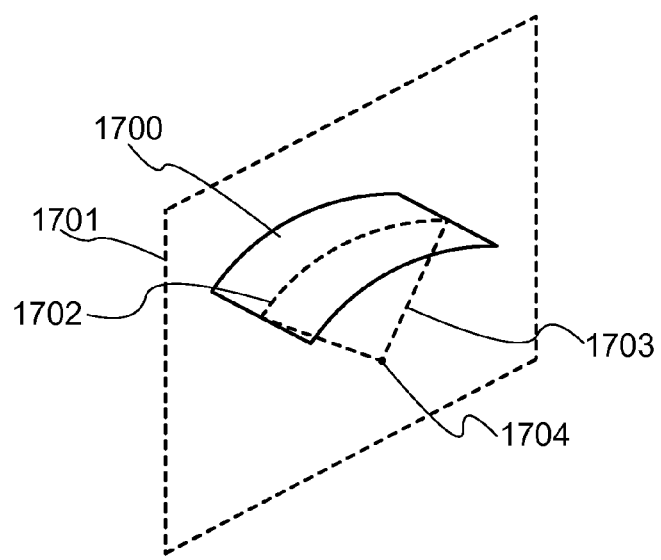
FIGS. 11A to 11C illustrate the radius of curvature of a surface.
Figure 11B:
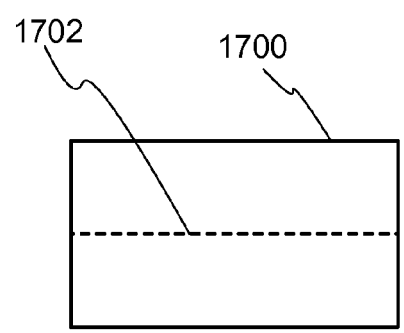
Figure 11C:
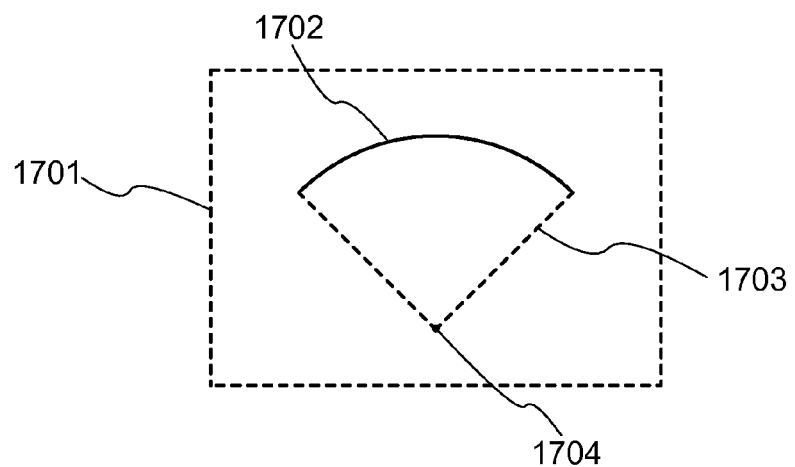

A description is given of the radius of curvature of a surface with reference to FIGS. 11A to 11C. In FIG. 11A, on a plane 1701 along which a curved surface 1700 is cut, part of a curve 1702 along the curved surface 1700 is approximate to an arc of a circle. The radius of the circle is referred to as a radius 1703 of curvature and the center of the circle is referred to as a center 1704 of curvature. FIG. 11B is a top view of the curved surface 1700. FIG. 11C is a cross-sectional view obtained by cutting the curved surface 1700 along the plane 1701. When a curved surface is cut along a plane, the radius of curvature of a curve in a cross section depends on the angle between the curved surface and the plane or on the cut position, and the smallest radius of curvature is defined as the radius of curvature of a surface in this specification and the like.

Figure 12A:
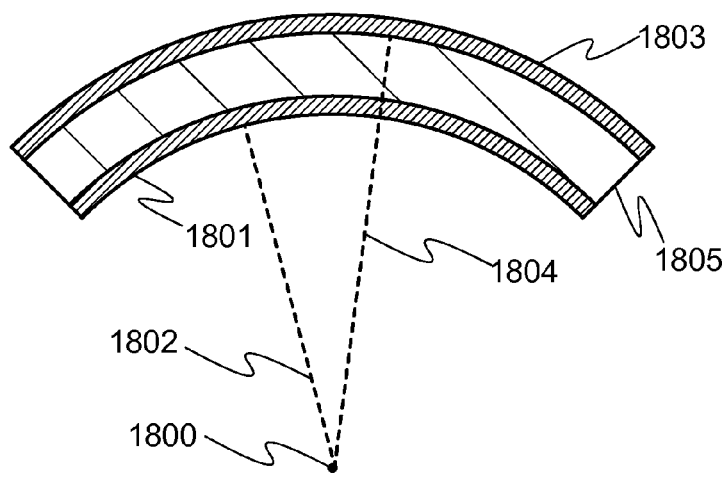
FIGS. 12A to 12D illustrate the radius of curvature of a film.
Figure 12B:
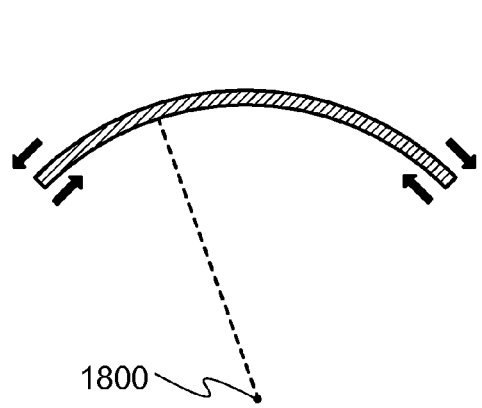

In the case of curving a secondary battery in which a component 1805 including electrodes and an electrolytic solution is sandwiched between two films as exterior bodies, a radius 1802 of curvature of a film 1801 close to a center 1800 of curvature of the secondary battery is smaller than a radius 1804 of curvature of a film 1803 far from the center 1800 of curvature (FIG. 12A). When the secondary battery is curved and has an arc-shaped cross section, compressive stress is applied to a surface of the film close to the center 1800 of curvature and tensile stress is applied to a surface of the film far from the center 1800 of curvature (FIG. 12B). However, by forming a pattern of projections and depressions on surfaces of the exterior bodies, influence of distortion can be reduced to be acceptable even when the compressive stress and the tensile stress are applied. For this reason, the secondary battery can change its form such that the exterior body on the side closer to the center of curvature has a curvature radius greater than or equal to 30 mm, preferably greater than or equal to 10 mm.

Figure 12C:
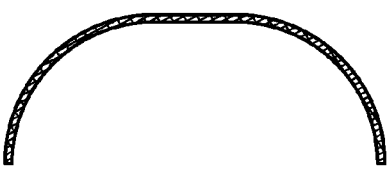
Figure 12D:

Note that the cross-sectional shape of the secondary battery is not limited to a simple arc shape, and the cross section can be partly arc-shaped; for example, a shape illustrated in FIG. 12C, a wavy shape illustrated in FIG. 12D, or an S shape can be used. When the curved surface of the secondary battery has a shape with a plurality of centers of curvature, the secondary battery can change its form such that a curved surface with the smallest radius of curvature among radii of curvature with respect to the plurality of centers of curvature, which is a surface of the exterior body on the side closer to the center of curvature, has a curvature radius greater than or equal to 30 mm, preferably greater than or equal to 10 mm.

Next, aging after fabrication of a storage battery will be described. Aging is preferably performed after fabrication of a storage battery. The aging can be performed under the following conditions, for example. Charge is performed at a rate of 0.001 C or more and 0.2 C or less at a temperature higher than or equal to room temperature and lower than or equal to 50° C. In the case where an electrolytic solution is decomposed and a gas is generated, the electrolytic solution is not likely to be in contact with a surface of the electrode in some regions due to accumulation of the gas in the cell. That is to say, an effectual reaction area of the electrode is reduced and effectual current density is increased.

When the current density is extremely high, a voltage drop occurs depending on the resistance of the electrode, lithium is inserted into the active material and lithium is deposited on the surface of the active material. The lithium deposition might reduce capacity. For example, if a coating film or the like is grown on the surface after lithium deposition, lithium deposited on the surface cannot be dissolved again. This lithium cannot contribute to capacity. In addition, when deposited lithium is physically collapsed and conduction with the electrode is lost, the lithium also cannot contribute to capacity. Therefore, the gas is preferably released before the potential of the electrode reaches the potential of lithium because of a voltage drop.

After the release of the gas, the charging state may be maintained at a temperature higher than room temperature, preferably higher than or equal to 30° C. and lower than or equal to 60° C., further preferably higher than or equal to 35° C. and lower than or equal to 50° C. for, for example, 1 hour or more and 100 hours or less. In the initial charge, an electrolytic solution decomposed on the surface forms a coating film. The formed coating film may thus be densified when the charging state is held at a temperature higher than room temperature after the release of the gas, for example.

[Coin-Type Storage Battery]

Figure 13A:
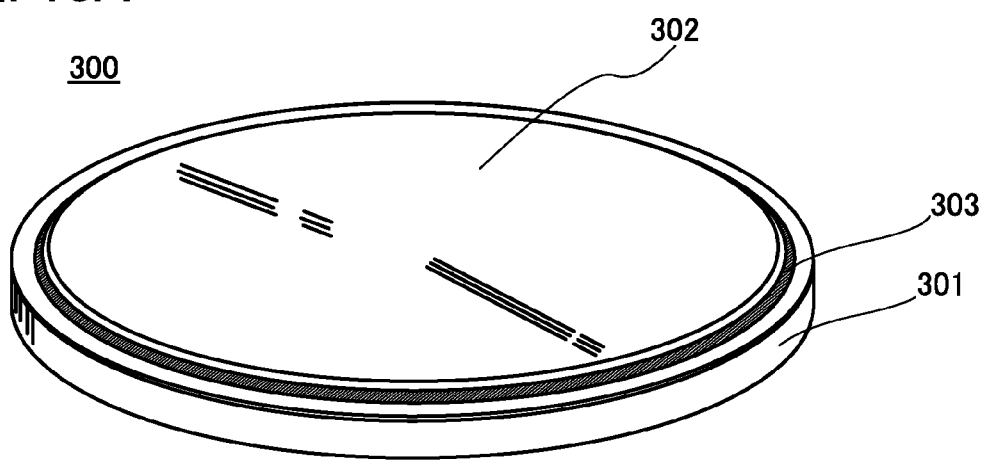
FIGS. 13A and 13B illustrate a coin-type storage battery.
Figure 13B:
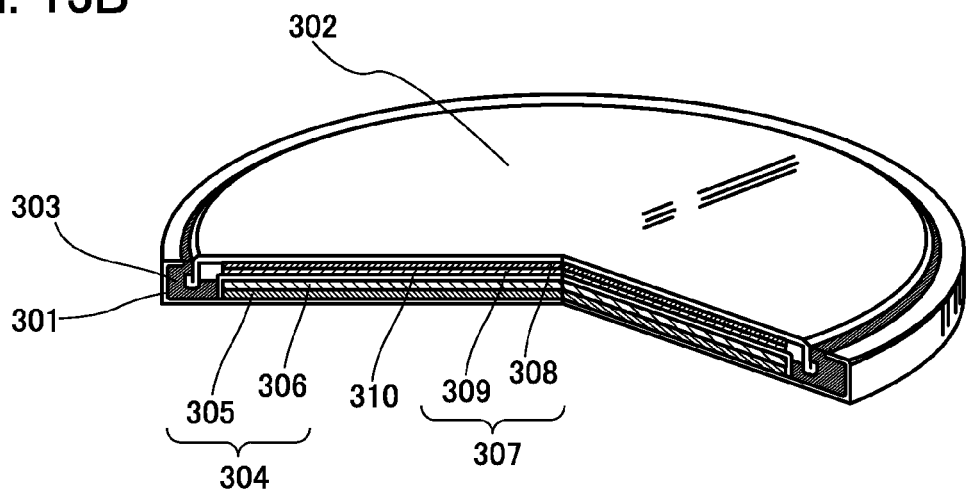

Next, an example of a coin-type storage battery will be described as an example of a power storage device with reference to FIGS. 13A and 13B. FIG. 13A is an external view of a coin-type (single-layer flat type) storage battery, and FIG. 13B is a cross-sectional view thereof.

In a coin-type storage battery 300, a positive electrode can 301 doubling as a positive electrode terminal and a negative electrode can 302 doubling as a negative electrode terminal are insulated from each other and sealed by a gasket 303 made of polypropylene or the like. A negative electrode 307 includes a negative electrode current collector 308 and a negative electrode active material layer 309 provided in contact with the negative electrode current collector 308. The negative electrode active material layer 309 includes the negative electrode active material shown in Embodiment 1. For the negative electrode 307, the negative electrode shown in Embodiment 2 is preferably used.

A positive electrode 304 includes a positive electrode current collector 305 and a positive electrode active material layer 306 provided in contact with the positive electrode current collector 305. The description of the positive electrode active material layer 502 can be referred to for the positive electrode active material layer 306. The description of the separator 507 can be referred to for the separator 310. The description of the electrolytic solution 508 can be referred to for the electrolytic solution.

Note that only one surface of each of the positive electrode 304 and the negative electrode 307 used for the coin-type storage battery 300 is provided with an active material layer.

For the positive electrode can 301 and the negative electrode can 302, a metal having corrosion resistance to an electrolytic solution, such as nickel, aluminum, or titanium, an alloy of such metals, or an alloy of such a metal and another metal (e.g., stainless steel or the like) can be used. Alternatively, it is preferable to cover the positive electrode can 301 and the negative electrode can 302 with nickel, aluminum, or the like in order to prevent corrosion due to the electrolytic solution. The positive electrode can 301 and the negative electrode can 302 are electrically connected to the positive electrode 304 and the negative electrode 307, respectively.

The negative electrode 307, the positive electrode 304, and the separator 310 are soaked in the electrolytic solution. Then, as illustrated in FIG. 13B, the positive electrode 304, the separator 310, the negative electrode 307, and the negative electrode can 302 are stacked in this order with the positive electrode can 301 positioned at the bottom, and the positive electrode can 301 and the negative electrode can 302 are subjected to pressure bonding with the gasket 303 provided therebetween. In such a manner, the coin-type storage battery 300 can be fabricated.

[Cylindrical Storage Battery]

Figure 14A:
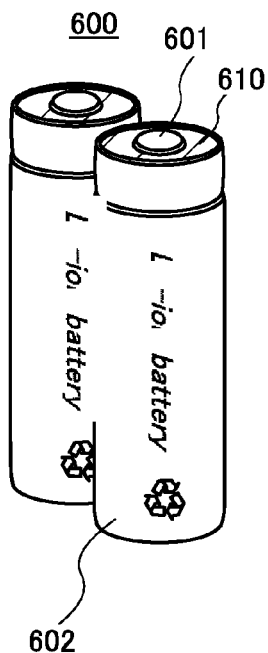
FIGS. 14A and 14B illustrate a cylindrical storage battery.

Next, an example of a cylindrical storage battery will be described as an example of a power storage device. The cylindrical storage battery will be described with reference to FIGS. 14A and 14B. As illustrated in FIG. 14A, a cylindrical storage battery 600 includes a positive electrode cap (battery cap) 601 on the top surface and a battery can (outer can) 602 on the side surface and bottom surface. The positive electrode cap 601 and the battery can (outer can) 602 are insulated from each other by a gasket (insulating gasket) 610.

Figure 14B:
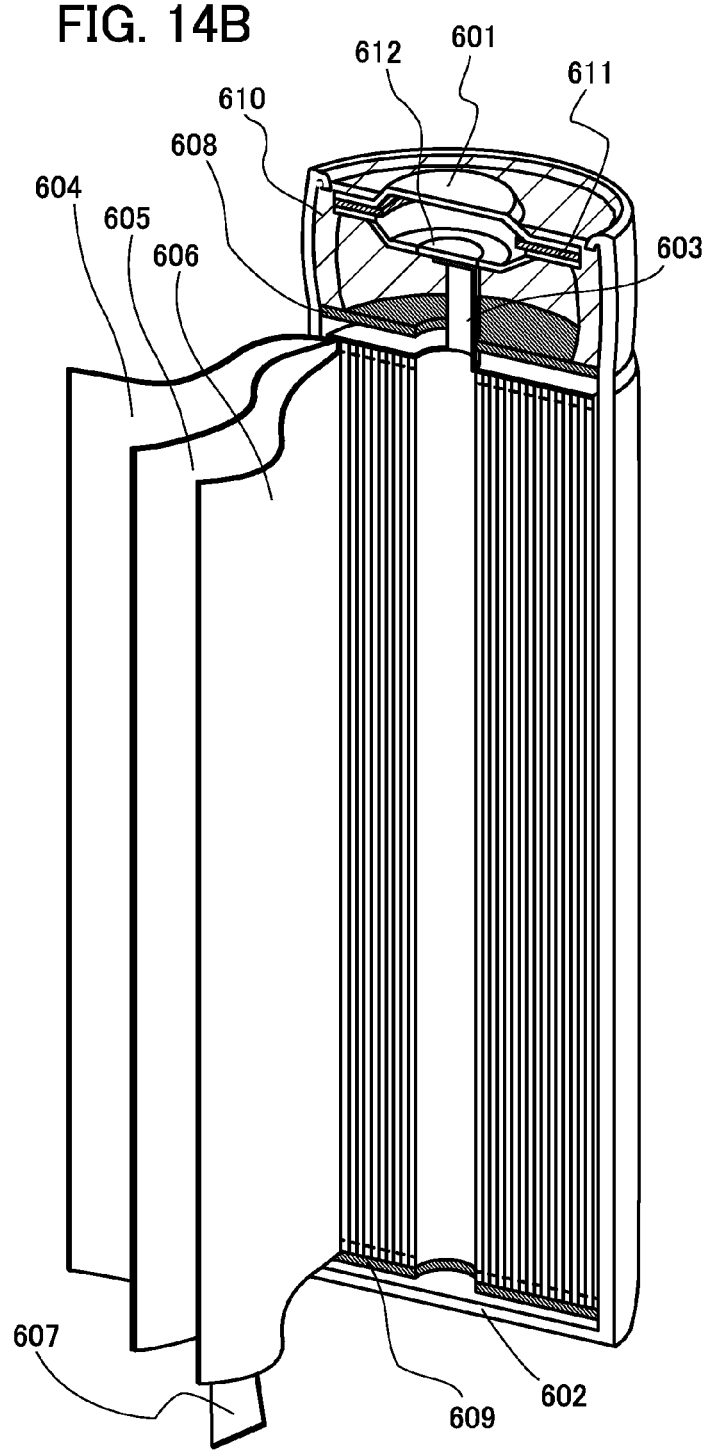

FIG. 14B is a schematic view of a cross-section of the cylindrical storage battery. Inside the battery can 602 having a hollow cylindrical shape, a battery element in which a strip-like positive electrode 604 and a strip-like negative electrode 606 are wound with a stripe-like separator 605 provided therebetween is provided. Although not illustrated, the battery element is wound around a center pin. One end of the battery can 602 is closed and the other end thereof is open. For the battery can 602, a metal having a corrosion resistance to an electrolytic solution, such as nickel, aluminum, or titanium, an alloy of such a metal, or an alloy of such a metal and another metal (e.g., stainless steel or the like) can be used. Alternatively, it is preferable to cover the battery can 602 with nickel, aluminum, or the like in order to prevent corrosion due to the electrolytic solution. Inside the battery can 602, the battery element in which the positive electrode 604, the negative electrode 606, and the separator 605 are wound is provided between a pair of insulating plates 608 and 609 which face each other. Further, a nonaqueous electrolytic solution (not illustrated) is injected inside the battery can 602 provided with the battery element. As the nonaqueous electrolytic solution, a nonaqueous electrolytic solution which is similar to that of the above coin-type storage battery can be used.

For the negative electrode 606, the negative electrode shown in Embodiment 1 is preferably used. The positive electrode 604 can be formed in a way similar to that of forming the positive electrode 503 in the above-described thin storage battery. Since the positive electrode and the negative electrode of the cylindrical storage battery are wound, active materials are preferably formed on both sides of the current collectors. A positive electrode terminal (positive electrode current collecting lead) 603 is connected to the positive electrode 604, and a negative electrode terminal (negative electrode current collecting lead) 607 is connected to the negative electrode 606. Both the positive electrode terminal 603 and the negative electrode terminal 607 can be formed using a metal material such as aluminum. The positive electrode terminal 603 and the negative electrode terminal 607 are resistance-welded to a safety valve mechanism 612 and the bottom of the battery can 602, respectively. The safety valve mechanism 612 is electrically connected to the positive electrode cap 601 through a positive temperature coefficient (PTC) element 611. The safety valve mechanism 612 cuts off electrical connection between the positive electrode cap 601 and the positive electrode 604 when the internal pressure of the battery exceeds a predetermined threshold value. Further, the PTC element 611, which serves as a thermally sensitive resistor whose resistance increases as temperature rises, limits the amount of current by increasing the resistance, in order to prevent abnormal heat generation. Note that barium titanate ($BaTiO_3$)-based semiconductor ceramic or the like can be used for the PTC element 611.

Note that in this embodiment, the coin-type storage battery, the cylindrical storage battery, and the thin storage battery are given as examples of the storage battery; however, any of storage batteries with a variety of shapes, such as a sealed storage battery and a rectangular storage battery, can be used. Further, a structure in which a plurality of positive electrodes, a plurality of negative electrodes, and a plurality of separators are stacked or a structure in which a positive electrode, a negative electrode, and a separator are rolled may be employed. For example, FIGS. 15A to 15C, FIGS. 16A to 16C, FIGS. 17A and 17B, FIGS. 18A1 to 18B2, and FIGS. 19A and 19B illustrate examples of other storage batteries.

[Structural Example of Storage Battery]

FIGS. 15A to 15C and FIGS. 16A to 16C illustrate structural examples of thin storage batteries. A wound body 993 illustrated in FIG. 15A includes a negative electrode 994, a positive electrode 995, and a separator 996.

The wound body 993 is obtained by winding a sheet of stacks in each of which the negative electrode 994 overlaps with the positive electrode 995 with the separator 996 provided therebetween. The wound body 993 is covered with a rectangular sealed container or the like; thus, a rectangular secondary battery is fabricated.

Note that the number of stacks each including the negative electrode 994, the positive electrode 995, and the separator 996 may be determined as appropriate depending on capacity and an element volume which are required. The negative electrode 994 is connected to a negative electrode current collector (not illustrated) via one of a lead electrode 997 and a lead electrode 998. The positive electrode 995 is connected to a positive electrode current collector (not illustrated) via the other of the lead electrode 997 and the lead electrode 998.

Figure 15A:
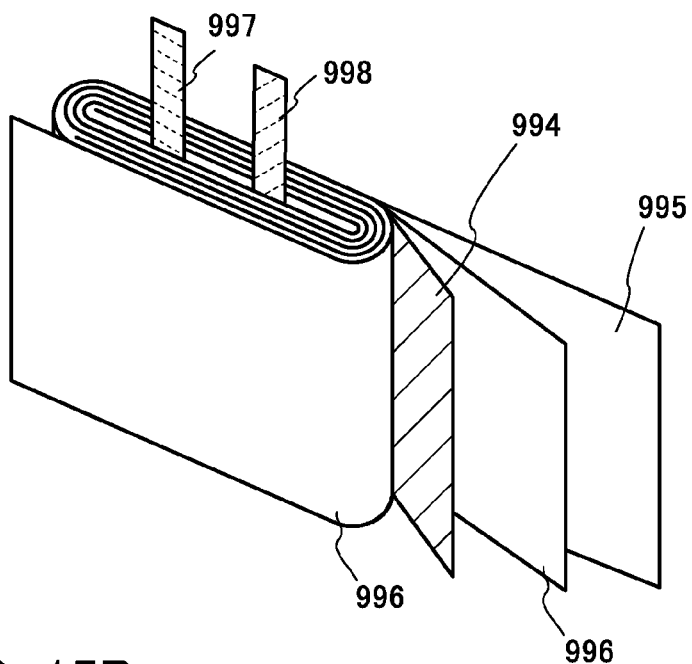
FIGS. 15A to 15C illustrate an example of a storage battery.
Figure 15B:
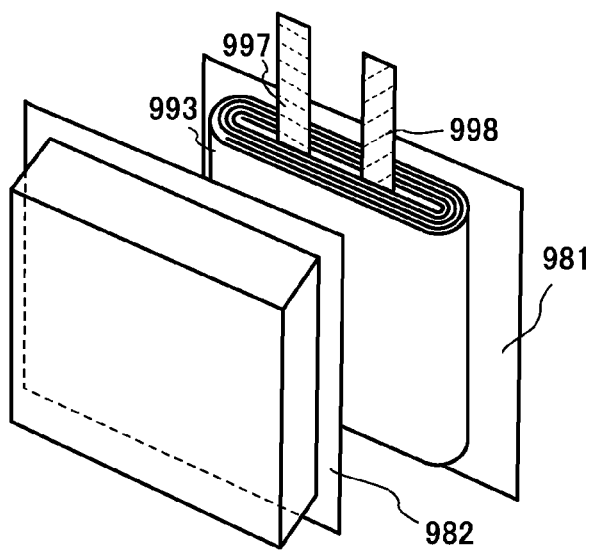
Figure 15C:
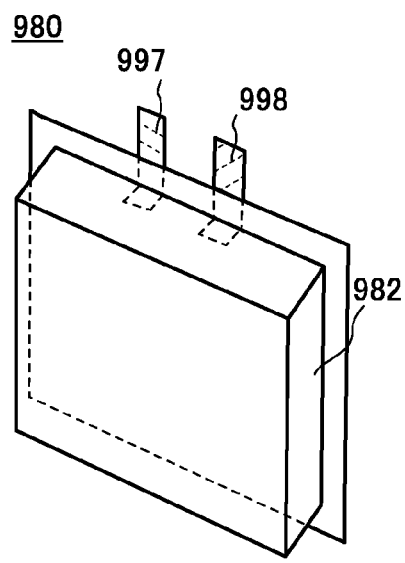

In a storage battery 980 illustrated in FIGS. 15B and 15C, the wound body 993 is packed in a space formed by bonding a film 981 and a film 982 having a depressed portion that serve as an exterior body by thermocompression bonding or the like. The wound body 993 includes the lead electrode 997 and the lead electrode 998, and is soaked in an electrolytic solution inside a space surrounded by the film 981 and the film 982 having a depressed portion.

For the film 981 and the film 982 having a depressed portion, a metal material such as aluminum or a resin material can be used, for example. With the use of a resin material for the film 981 and the film 982 having a depressed portion, the film 981 and the film 982 having a depressed portion can be changed in their forms when external force is applied; thus, a flexible storage battery 980 can be fabricated.

Although FIGS. 15B and 15C illustrate an example where a space is formed by two films, the wound body 993 may be placed in a space formed by bending one film.

Figure 16A:
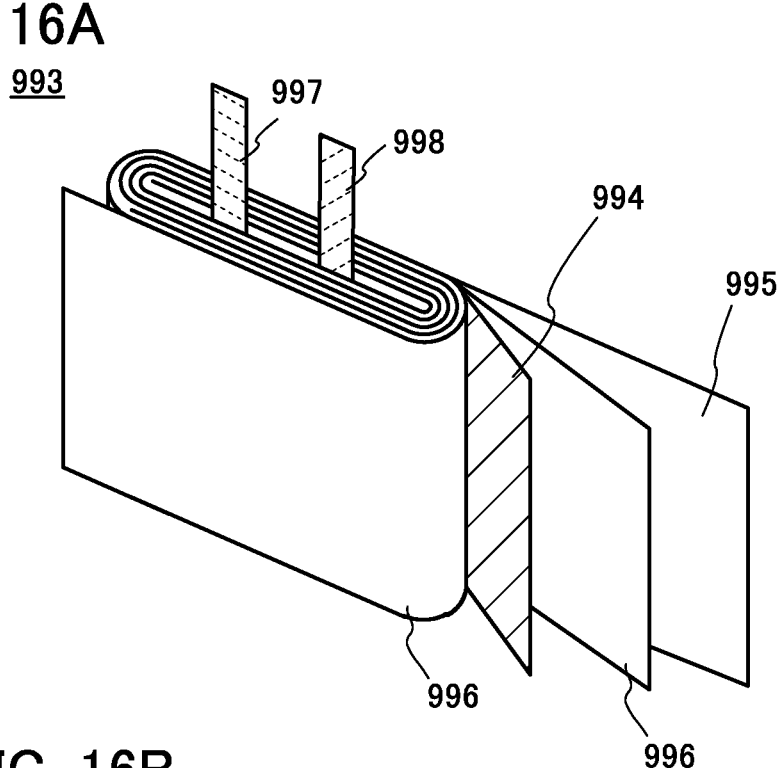
FIGS. 16A to 16C illustrate an example of a storage battery.
Figure 16B:
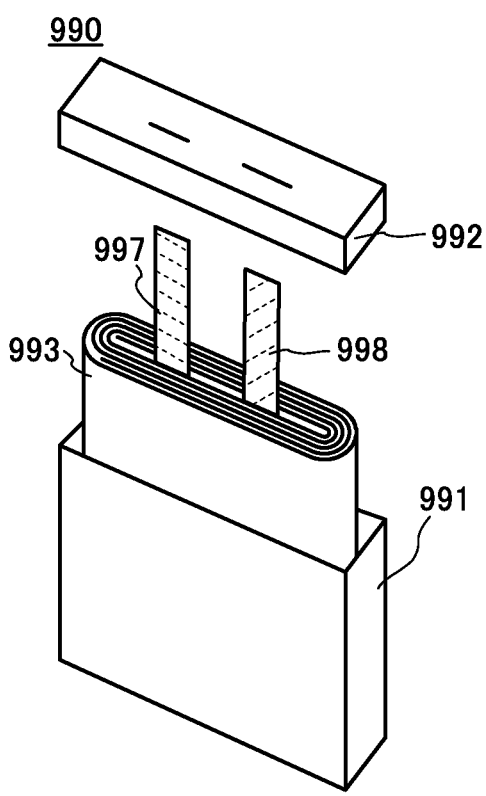
Figure 16C:
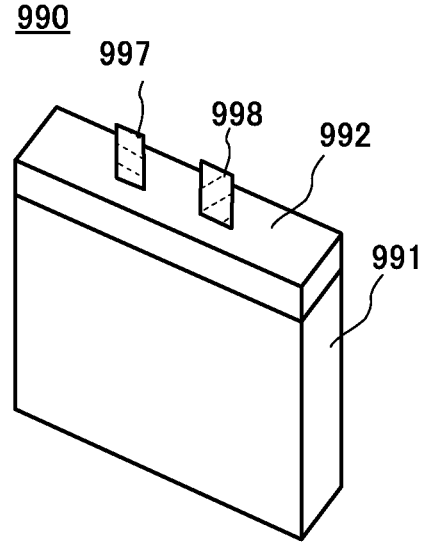

For example, FIGS. 16A to 16C illustrate another example of a flexible thin storage battery. The wound body 993 illustrated in FIG. 16A is the same as that illustrated in FIG. 15A, and a detailed description thereof is omitted.

In a storage battery 990 illustrated in FIGS. 16B and 16C, the wound body 993 is packed in an exterior body 991. The wound body 993 includes the lead electrode 997 and the lead electrode 998, and is soaked in an electrolytic solution inside a space surrounded by the exterior body 991 and an exterior body 992. For example, a metal material such as aluminum or a resin material can be used for the exterior bodies 991 and 992. With the use of a resin material for the exterior bodies 991 and 992, the exterior bodies 991 and 992 can be changed in their forms when external force is applied; thus, a flexible thin storage battery can be fabricated.

[Structural Examples of Power Storage Systems]

Structural examples of power storage systems will be described with reference to FIGS. 17A and 17B, FIGS. 18A1 to 18B2, and FIGS. 19A and 19B. Here, a power storage system refers to, for example, a device including a power storage device. Here, an example in which a storage battery is used as the power storage device is described, and a lithium-ion capacitor and an electric double layer capacitor can be used as the power storage device as appropriate.

Figure 17A:
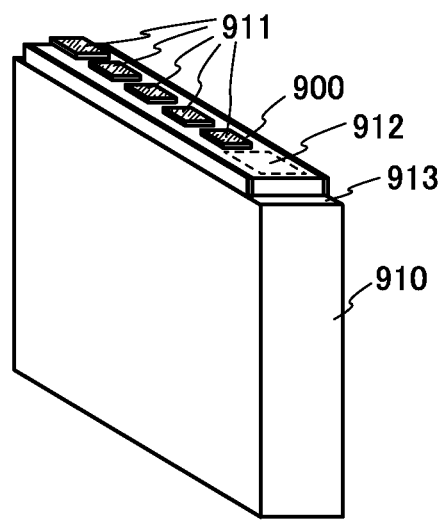
FIGS. 17A and 17B illustrate an example of a power storage system.
Figure 17B:
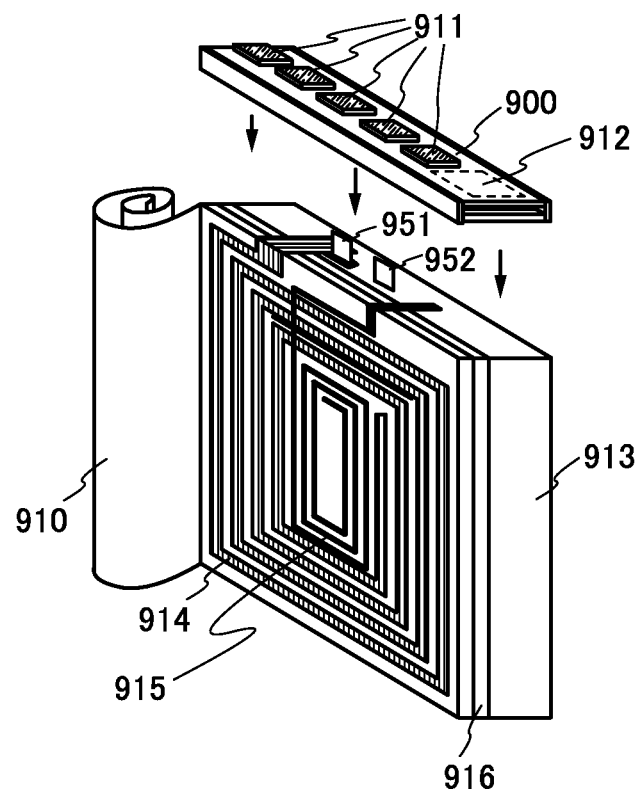

FIGS. 17A and 17B show external views of a power storage system. The power storage system includes a circuit board 900 and a storage battery 913. A label 910 is attached to the storage battery 913. As shown in FIG. 17B, the power storage system further includes a terminal 951, a terminal 952, an antenna 914, and an antenna 915.

The circuit board 900 includes terminals 911 and a circuit 912. The terminals 911 are connected to the terminals 951 and 952, the antennas 914 and 915, and the circuit 912. Note that a plurality of terminals 911 serving as a control signal input terminal, a power supply terminal, and the like may be provided.

Each of the antennas 914 and 915 is not limited to having a coil shape and may have a linear shape or a plate shape, for example. Further, a planar antenna, an aperture antenna, a traveling-wave antenna, an EH antenna, a magnetic-field antenna, a dielectric antenna, or the like may be used. Alternatively, the antenna 914 or the antenna 915 may be a flat-plate conductor. The flat-plate conductor can serve as one of conductors for electric field coupling. That is, the antenna 914 or the antenna 915 can serve as one of two conductors of a capacitor. Thus, power can be transmitted and received not only by an electromagnetic field or a magnetic field but also by an electric field.

The line width of the antenna 914 is preferably larger than that of the antenna 915. This makes it possible to increase the amount of electric power received by the antenna 914.

The power storage system includes a layer 916 between the storage battery 913 and the antennas 914 and 915. The layer 916 has a function of blocking an electromagnetic field by the storage battery 913, for example. As the layer 916, for example, a magnetic body can be used.

Note that the structure of the power storage system is not limited to that shown in FIGS. 17A and 17B.

For example, as shown in FIGS. 18A1 and 18A2, two opposing surfaces of the storage battery 913 in FIGS. 17A and 17B may be provided with respective antennas. FIG. 18A1 is an external view illustrating one of the opposing surfaces, and FIG. 18A2 is an external view illustrating the other of the opposing surfaces. Note that for the same portions as the power storage system in FIGS. 17A and 17B, description on the power storage system in FIGS. 17A and 17B can be referred to as appropriate.

As illustrated in FIG. 18A1, the antenna 914 is provided on one of the opposing surfaces of the storage battery 913 with the layer 916 provided therebetween, and as illustrated in FIG. 18A2, an antenna 915 is provided on the other of the opposing surfaces of the storage battery 913 with the layer 917 provided therebetween. The layer 917 has a function of blocking an electromagnetic field by the storage battery 913, for example. As the layer 917, for example, a magnetic body can be used.

With the above structure, both of the antennas 914 and 915 can be increased in size.

Alternatively, as illustrated in FIGS. 18B1 and 18B2, two opposing surfaces of the storage battery 913 in FIGS. 17A and 17B may be provided with different types of antennas. FIG. 18B1 is an external view showing one of the opposing surfaces, and FIG. 18B2 is an external view showing the other of the opposing surfaces. Note that for the same portions as the power storage system in FIGS. 17A and 17B, description on the power storage system in FIGS. 17A and 17B can be referred to as appropriate.

As illustrated in FIG. 18B1, the antenna 914 and the antenna 915 are provided on one of the opposing surfaces of the storage battery 913 with the layer 916 provided therebetween, and as illustrated in FIG. 18B2, an antenna 918 is provided on the other of the opposing surfaces of the storage battery 913 with a layer 917 provided therebetween. The antenna 918 has a function of performing data communication with an external device, for example. An antenna with a shape that can be used for the antennas 914 and 915, for example, can be used as the antenna 918. As an example of a method for communication between the power storage system and another device via the antenna 918, a response method that can be used between the power storage system and another device, such as NFC, can be employed.

Figure 19A:
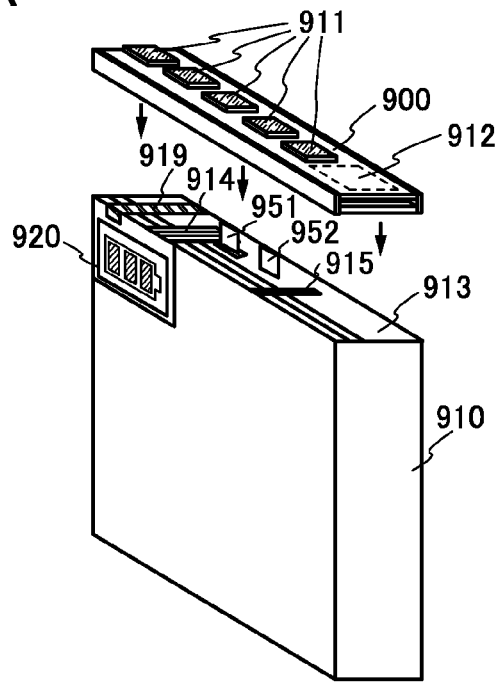
FIGS. 19A and 19B each illustrate an example of a power storage system.

Alternatively, as illustrated in FIG. 19A, the storage battery 913 in FIGS. 17A and 17B may be provided with a display device 920. The display device 920 is electrically connected to the terminal 911 via a terminal 919. It is possible that the label 910 is not provided in a portion where the display device 920 is provided. Note that for the same portions as the power storage system in FIGS. 17A and 17B, description on the power storage system in FIGS. 17A and 17B can be referred to as appropriate.

The display device 920 can display, for example, an image showing whether or not charging is being carried out, an image showing the amount of stored power, or the like. As the display device 920, electronic paper, a liquid crystal display device, an electroluminescent (EL) display device, or the like can be used. For example, power consumption of the display device 920 can be reduced when electronic paper is used.

Figure 19B:
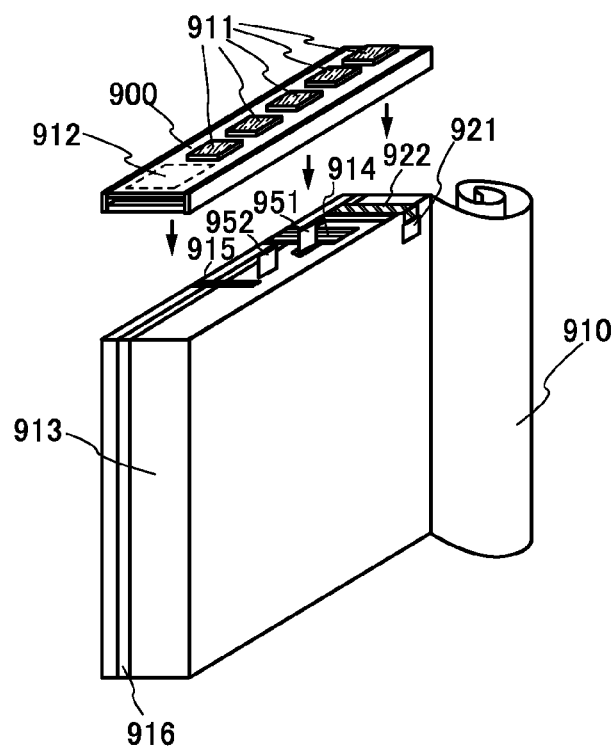

Alternatively, as illustrated in FIG. 19B, the storage battery 913 illustrated in FIGS. 17A and 17B may be provided with a sensor 921. The sensor 921 is electrically connected to the terminal 911 via a terminal 922. Note that for the same portions as the power storage system in FIGS. 17A and 17B, description on the power storage system in FIGS. 17A and 17B can be referred to as appropriate.

As the sensor 921, a sensor that has a function of measuring, for example, force, displacement, position, speed, acceleration, angular velocity, rotational frequency, distance, light, liquid, magnetism, temperature, chemical substance, sound, time, hardness, electric field, electric current, voltage, electric power, radiation, flow rate, humidity, gradient, oscillation, odor, or infrared rays can be used. With the sensor 921, for example, data on the environment (e.g., temperature) where the power storage system is placed can be acquired and stored in a memory in the circuit 912.

The electrode of one embodiment of the present invention is used in the storage battery and the power storage system that are described in this embodiment. The capacity of the storage battery and the power storage system can thus be high. Furthermore, energy density can be high. Moreover, reliability can be high, and life can be long.

This embodiment can be implemented in appropriate combination with any of the other embodiments.

Embodiment 3

In this embodiment, examples of an electronic device including the above power storage device will be described.

Examples of electric devices include the following: display devices such as televisions and monitors, lighting devices, desktop or laptop personal computers, word processors, image reproduction devices which reproduce still images or moving images stored in recording media such as digital versatile discs (DVDs), portable or stationary audio reproduction devices such as compact disc (CD) players and digital audio players, portable or stationary radio receivers, audio recording and reproducing devices such as tape recorders and IC recorders (voice recorders), headphone, stereos, remote controllers, clocks such as table clocks and wall clocks, cordless phone handsets, transceivers, cellular phones, car phones, portable or stationary game machines, pedometers, calculators, portable information terminals, electronic notebooks, e-book readers, electronic translators, audio input devices such as microphones, cameras such as still cameras and video cameras, toys, electric shavers, electric toothbrushes, high-frequency heating appliances such as microwave ovens, electric rice cookers, electric washing machines, electric vacuum cleaners, water heaters, electric fans, hair dryers, air-conditioning systems such as humidifiers, dehumidifiers, and air conditioners, dishwashing machines, dish drying machines, clothes dryers, futon dryers, electric refrigerators, electric freezers, electric refrigerator-freezers, freezers for preserving DNA, flashlights, electric power tools, alarm devices such as smoke detectors, gas alarms, and security alarms, health and medical equipment such as hearing aids, cardiac pacemakers, X-ray equipment, radiation counters, electric massagers, and dialyzers.

Further, industrial equipment such as guide lights, traffic lights, meters such as gas meters and water meters, belt conveyors, elevators, escalators, industrial robots, wireless relay stations, base stations of cellular phones, power storage systems, and power storage devices for leveling the amount of power supply and smart grid can be given.

FIGS. 20A to 20G illustrate examples of electronic devices including a flexible power storage device. Examples of an electronic device including a flexible power storage device include television devices (also referred to as televisions or television receivers), monitors for computers or the like, cameras such as digital cameras or digital video cameras, digital photo frames, cellular phones (also referred to as mobile phones or mobile phone devices), portable game machines, portable information terminals, audio reproducing devices, large game machines such as pachinko machines, and the like.

In addition, a flexible power storage device can be incorporated along a curved inside/outside wall surface of a house or a building or a curved interior/exterior surface of a vehicle.

Figure 20A:
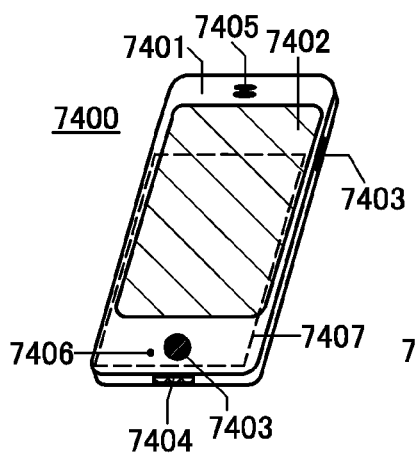
FIGS. 20A to 20G illustrate examples of electronic devices.

FIG. 20A illustrates an example of a cellular phone. A cellular phone 7400 is provided with a display portion 7402 incorporated in a housing 7401, an operation button 7403, an external connection port 7404, a speaker 7405, a microphone 7406, and the like. Note that the cellular phone 7400 includes a power storage device 7407.

Figure 20B:
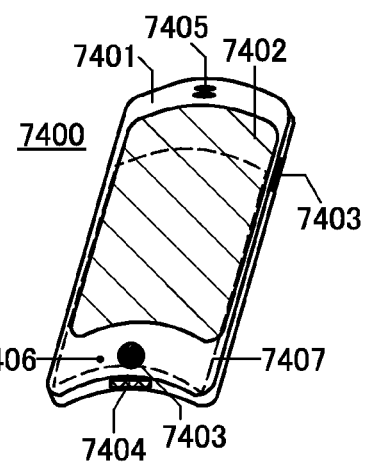
Figure 20C:
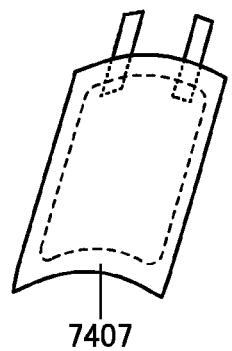

The mobile phone 7400 illustrated in FIG. 20B is bent. When the whole cellular phone 7400 is bent by the external force, the power storage device 7407 included in the mobile phone 7400 is also bent. FIG. 20C illustrates the bent power storage device 7407. As the power storage device 7407, a thin storage battery is used here. The power storage device 7407 is fixed in a state of being bent. Note that the power storage device 7407 includes a lead electrode 7408 electrically connected to a current collector 7409. The current collector is, for example, copper foil, and partly alloyed with gallium; thus, adhesion between the current collector 7409 and an active material layer in contact with the current collector 7409 is improved and the power storage device 7407 can have high reliability even in a state of being bent.

Figure 20D:
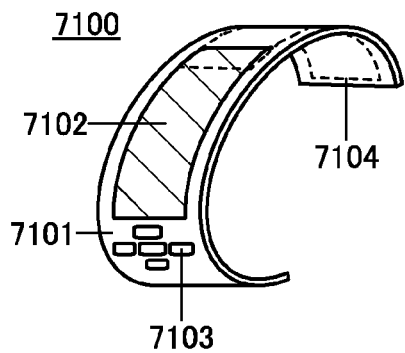
Figure 20E:
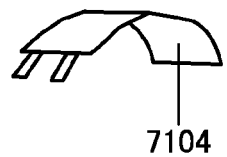

FIG. 20D illustrates an example of a bangle-type display device. A portable display device 7100 includes a housing 7101, a display portion 7102, an operation button 7103, and a power storage device 7104. FIG. 20E illustrates the bent power storage device 7104. When the display device is worn on a user's arm while the power storage device 7104 is bent, the housing changes its form and the curvature of a part or the whole of the power storage device 7104 is changed. Note that the radius of curvature of a curve at a point refers to the radius of the circular arc that best approximates the curve at that point. The reciprocal of the radius of curvature is curvature. Specifically, a part or the whole of the housing or the main surface of the power storage device 7104 is changed in the range of radius of curvature from 40 mm to 150 mm. When the radius of curvature at the main surface of the power storage device 7104 is greater than or equal to 40 mm and less than or equal to 150 mm, the reliability can be kept high.

Figure 20F:
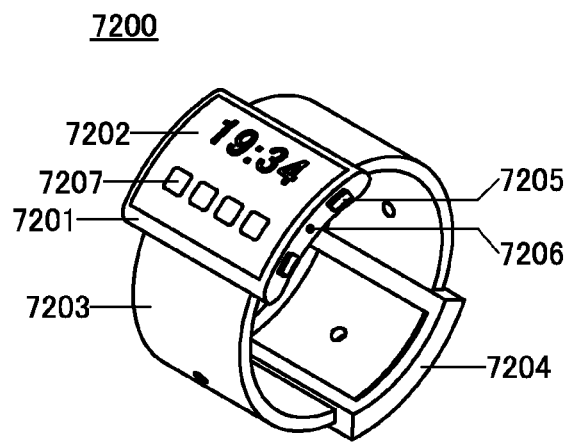

FIG. 20F illustrates an example of a watch-type portable information terminal. A portable information terminal 7200 includes a housing 7201, a display portion 7202, a band 7203, a buckle 7204, an operation button 7205, an input output terminal 7206, and the like.

The portable information terminal 7200 is capable of executing a variety of applications such as mobile phone calls, e-mailing, viewing and editing texts, music reproduction, Internet communication, and a computer game.

The display surface of the display portion 7202 is bent, and images can be displayed on the bent display surface. Further, the display portion 7202 includes a touch sensor, and operation can be performed by touching the screen with a finger, a stylus, or the like. For example, by touching an icon 7207 displayed on the display portion 7202, application can be started.

With the operation button 7205, a variety of functions such as time setting, power ON/OFF, ON/OFF of wireless communication, setting and cancellation of manner mode, and setting and cancellation of power saving mode can be performed. For example, the functions of the operation button 7205 can be set freely by the operating system incorporated in the portable information terminal 7200.

Further, the portable information terminal 7200 can perform near field communication that is a communication method based on an existing communication standard. In that case, for example, mutual communication between the portable information terminal 7200 and a headset capable of wireless communication can be performed, and thus hands-free calling is possible.

Moreover, the portable information terminal 7200 includes the input output terminal 7206, and data can be directly transmitted to and received from another information terminal via a connector. Power charging through the input output terminal 7206 is possible. Note that the charging operation may be performed by wireless power feeding without using the input output terminal 7206.

The display portion 7202 of the portable information terminal 7200 is provided with a power storage device including the electrode member of one embodiment of the present invention. For example, the power storage device 7104 illustrated in FIG. 20E that is in the state of being curved can be provided in the housing 7201. Alternatively, the power storage device 7104 illustrated in FIG. 20E can be provided in the band 7203 such that it can be curved.

Figure 20G:
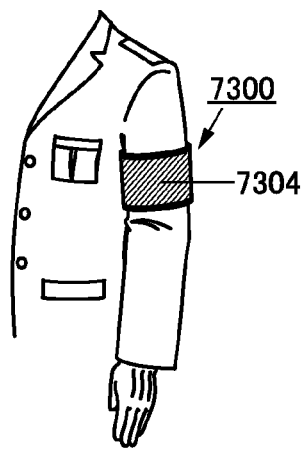

FIG. 20G illustrates an example of an armband-type display device. A display device 7300 includes a display portion 7304 and the power storage device of one embodiment of the present invention. The display device 7300 can include a touch sensor in the display portion 7304 and can serve as a portable information terminal.

The display surface of the display portion 7304 is bent, and images can be displayed on the bent display surface. A display state of the display device 7300 can be changed by, for example, near field communication that is a communication method based on an existing communication standard.

The display device 7300 includes an input output terminal, and data can be directly transmitted to and received from another information terminal via a connector. Power charging through the input output terminal is possible. Note that the charging operation may be performed by wireless power feeding without using the input output terminal.

This embodiment can be implemented in appropriate combination with any of the other embodiments.

Embodiment 4

In this embodiment, examples of vehicles using power storage devices will be described.

The use of a power storage device in vehicles can lead to next-generation clean energy vehicles such as hybrid electric vehicles (HEVs), electric vehicles (EVs), and plug-in hybrid electric vehicles (PHEVs).

Figure 21A:
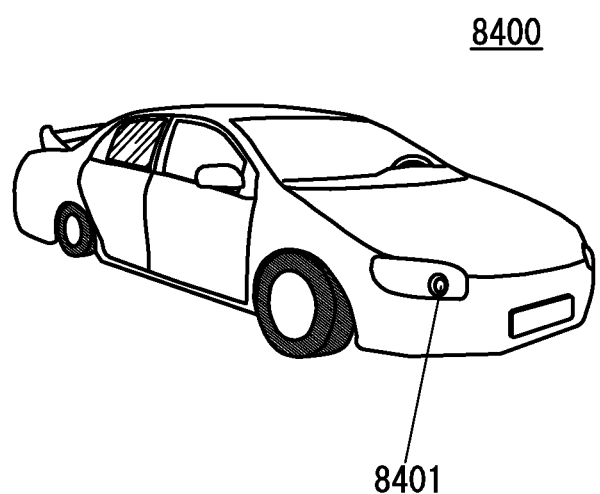
FIGS. 21A and 21B illustrate examples of vehicles.
Figure 21B:
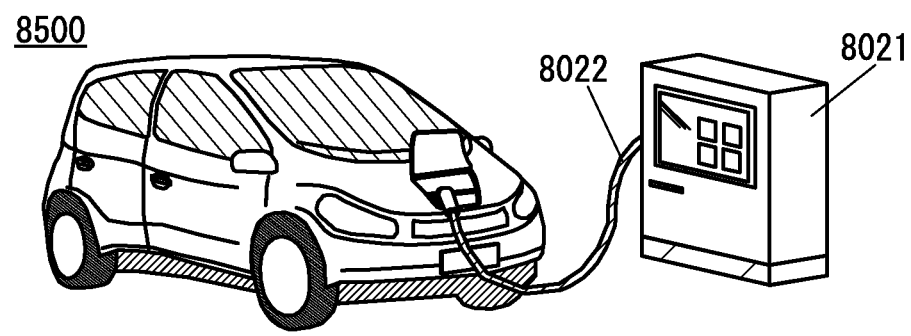

FIGS. 21A and 21B each illustrate an example of a vehicle using one embodiment of the present invention. An automobile 8400 illustrated in FIG. 21A is an electric vehicle which runs on the power of the electric motor. Alternatively, the automobile is a hybrid electric vehicle capable of driving using either the electric motor or the engine as appropriate. One embodiment of the present invention achieves a high-mileage vehicle. The automobile 8400 includes a power storage device. The power storage device is used not only for driving the electric motor, but also for supplying electric power to a light-emitting device such as a headlight 8401 or a room light (not illustrated).

The power storage device can also supply electric power to a display device included in the automobile 8400, such as a speedometer or a tachometer. Furthermore, the power storage device can supply electric power to a semiconductor device included in the automobile 8400, such as a navigation system.

FIG. 21B illustrates an automobile 8500 including a power storage device. The automobile 8500 can be charged when the power storage device is supplied with electric power through external charging equipment by a plug-in system, a contactless power feeding system, or the like. In FIG. 21B, the power storage device included in the automobile 8500 is charged with the use of a ground-based charging apparatus 8021 through a cable 8022. In charging, a given method such as CHAdeMO (registered trademark) or Combined Charging System may be employed as a charging method, the standard of a connector, or the like as appropriate. The charging apparatus 8021 may be a charging station provided in a commerce facility or a power source in a house. For example, with the use of a plug-in technique, a power storage device included in the automobile 8500 can be charged by being supplied with electric power from outside. The charging can be performed by converting AC electric power into DC electric power through a converter such as an AC-DC converter.

Further, although not illustrated, the vehicle may include a power receiving device so as to be charged by being supplied with electric power from an above-ground power transmitting device in a contactless manner. In the case of the contactless power supply system, by fitting the power transmitting device in a road or an exterior wall, charging can be performed not only when the electric vehicle is stopped but also when driven. In addition, the contactless power supply system may be utilized to perform transmission/reception between vehicles. Furthermore, a solar cell may be provided in the exterior of the automobile to charge the power storage device when the automobile stops or moves. To supply electric power in such a contactless manner, an electromagnetic induction method or a magnetic resonance method can be used.

According to one embodiment of the present invention, the power storage device can have improved cycle characteristics and reliability. Furthermore, according to one embodiment of the present invention, the power storage device itself can be made more compact and lightweight as a result of improved characteristics of the power storage device. The compact and lightweight power storage device contributes to a reduction in the weight of a vehicle, and thus increases the mileage. Further, the power storage device included in the vehicle can be used as a power source for supplying electric power to products other than the vehicle. In such a case, the use of a commercial power source can be avoided at peak time of electric power demand.

This embodiment can be implemented in appropriate combination with any of the other embodiments.

This application is based on Japanese Patent Application serial no. 2014-147972 filed with Japan Patent Office on Jul. 18, 2014, the entire contents of which are hereby incorporated by reference.

What is claimed is:

1. An electrode comprising:
a current collector; and
an active material layer,
wherein the active material layer comprises first to fourth layers,
wherein the second layer is provided between the first layer and the third layer,
wherein the third layer is provided between the second layer and the fourth layer,
wherein the first layer is in contact with the current collector,
wherein the first layer comprises a first element which is selected from, Mg, Ca, Ga, Al, Ge, Sn, Pb, Sb, Bi, Ag, Zn, Cd, As, Hg, and In,
wherein the third layer comprises a second element which is selected from, Mg, Ca, Ga, Al, Ge, Sn, Pb, Sb, Bi, Ag, Zn, Cd, As, Hg, and In,
wherein the second layer comprises the first element or the second element,
wherein the second layer comprises at least one of oxygen, nitrogen, sulfur, phosphorus, and fluorine,
wherein the fourth layer comprises the first element or the second element, and
wherein the fourth layer comprises at least one of oxygen, nitrogen, sulfur, phosphorus, and fluorine.

2. The electrode according to claim 1,
wherein the first layer comprises Sn, and
wherein the third layer comprises Sn.

3. The electrode according to claim 1,
wherein the second layer comprises oxide of the first element or the second element, and
wherein the fourth layer comprises oxide of the first element or the second element.

4. The electrode according to claim 1,
wherein the second layer comprises nitride of the first element or the second element, and
wherein the fourth layer comprises nitride of the first element or the second element.

5. The electrode according to claim 1,
wherein the first layer has a thickness greater than or equal to 2 nm and less than or equal to 50 nm, and
wherein the third layer has a thickness greater than or equal to 2 nm and less than or equal to 50 nm.

6. The electrode according to claim 1,
wherein the second layer has a thickness greater than or equal to 1.6 nm and less than or equal to 60 nm, and
wherein the fourth layer has a thickness greater than or equal to 1.6 nm and less than or equal to 60 nm.

7. An electrode according to claim 1,
wherein the current collector is a negative electrode current collector, and
wherein the active material layer is a negative electrode active material layer.

8. A power storage device comprising:
a positive electrode; and
a negative electrode, the negative electrode comprising a negative electrode current collector and a negative electrode active material layer,
wherein the negative electrode active material layer comprises first to fourth layers,
wherein the second layer is provided between the first layer and the third layer,
wherein the third layer is provided between the second layer and the fourth layer,
wherein the first layer is in contact with the current collector,
wherein the first layer comprises Sn,
wherein the third layer comprises Sn,
wherein the second layer and the fourth layer comprises Sn,
wherein the second layer and the fourth layer comprises at least one of oxygen, nitrogen, sulfur, phosphorus, and fluorine, and
wherein the negative electrode active material layer is provided between the negative electrode current collector and the positive electrode.

9. A power storage device according to claim 8,
wherein the second layer and the fourth layer comprises tin oxide.

10. A power storage device according to claim 8,
wherein the second layer and the fourth layer comprises tin nitride.

11. A power storage device according to claim 8,
wherein the first layer has a thickness greater than or equal to 2 nm and less than or equal to 50 nm, and
wherein the third layer has a thickness greater than or equal to 2 nm and less than or equal to 50 nm.

12. A power storage device according to claim 8,
wherein the second layer has a thickness greater than or equal to 1.6 nm and less than or equal to 60 nm, and
wherein the fourth layer has a thickness greater than or equal to 1.6 nm and less than or equal to 60 nm.

13. An electronic device comprising:
the power storage device according to claim 8; and
a display device, a microphone, a speaker, an operation button, a housing, or a sensor.

14. A vehicle comprising:
the power storage device according to claim 8; and
a steering wheel or a display device.

15. A power storage device comprising:
a positive electrode; and
a negative electrode, the negative electrode comprising a negative electrode current collector and a negative electrode active material layer,
wherein the negative electrode active material layer comprises first to fourth layers,
wherein the second layer is provided between the first layer and the third layer,
wherein the third layer is provided between the second layer and the fourth layer,
wherein the first layer is in contact with the current collector,
wherein the first layer comprises a first element which is selected from Si, and Sn,
wherein the third layer comprises a second element which is selected from Si, and Sn,
wherein the second layer and the fourth layer comprises the first element or the second element,
wherein the second layer and the fourth layer comprises nitride of the first element or the second element, and
wherein the negative electrode active material layer is provided between the negative electrode current collector and the positive electrode.

16. A power storage device according to claim 15,
wherein the first layer has a thickness greater than or equal to 2 nm and less than or equal to 50 nm, and
wherein the third layer has a thickness greater than or equal to 2 nm and less than or equal to 50 nm.

17. A power storage device according to claim 15,
wherein the second layer has a thickness greater than or equal to 1.6 nm and less than or equal to 60 nm, and
wherein the fourth layer has a thickness greater than or equal to 1.6 nm and less than or equal to 60 nm.

18. A power storage device according to claim 15,
wherein the first layer and the third layer include amorphous silicon, and
wherein the second layer and the fourth layer include oxygen and silicon.

* * * * *